United States Patent
Nims et al.

(10) Patent No.: US 10,569,177 B2
(45) Date of Patent: *Feb. 25, 2020

(54) SYSTEM AND METHOD FOR CREATING AN AVATAR

(71) Applicant: NIKE, Inc., Beaverton, OR (US)

(72) Inventors: Jason Nims, Portland, OR (US); Roberto Tagliabue, Lake Oswego, OR (US); Danielle M. Quatrochi, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/009,593

(22) Filed: Jun. 15, 2018

(65) Prior Publication Data
US 2018/0296923 A1 Oct. 18, 2018

Related U.S. Application Data

(63) Continuation of application No. 12/476,724, filed on Jun. 2, 2009, now Pat. No. 10,022,631.

(Continued)

(51) Int. Cl.
*A63F 13/65* (2014.01)
*A63F 13/79* (2014.01)
(Continued)

(52) U.S. Cl.
CPC .......... *A63F 13/65* (2014.09); *A63F 13/5258* (2014.09); *A63F 13/53* (2014.09); *A63F 13/58* (2014.09); *A63F 13/79* (2014.09); *A63F 13/816* (2014.09); *A63F 13/88* (2014.09); *A63F 13/55* (2014.09); *A63F 2300/5553* (2013.01);
(Continued)

(58) Field of Classification Search
CPC ...... G06F 3/04812; G06F 9/451; A63F 13/00; A63F 13/10; A63F 13/12; A63F 13/30–88; A63F 2300/5553; A63F 2300/69; A63F 2300/8082
See application file for complete search history.

(56) References Cited

U.S. PATENT DOCUMENTS 6,280,323 B1  8/2001  Yamazaki et al.
6,545,682 B1  4/2003  Ventrella et al.
(Continued)

FOREIGN PATENT DOCUMENTS

CN  1695144 A  11/2005
CN  101111743 A  1/2008
(Continued)

OTHER PUBLICATIONS

Aug. 5, 2009—(WO) ISR & WO—App. No. PCT/US09/045960.

*Primary Examiner* — Eric J. Bycer
(74) *Attorney, Agent, or Firm* — Banner & Witcoff, Ltd.

(57) ABSTRACT

An avatar or avatar environment to visualize data may be provided within a social networking system or service, for example as part of the Internet, and/or within a desktop widget, panel, gadget, or the like. The avatar may further evolve or alter its appearance, animation, or other visual or audio characteristics in response to the data or other input such as athletic activity performed by a corresponding user. In particular, the avatar of an embodiment may respond to and provide visualization of athletic or sport performance data.

26 Claims, 20 Drawing Sheets

Related U.S. Application Data

(60) Provisional application No. 61/058,174, filed on Jun. 2, 2008.

(51) Int. Cl.

| | | |
|---|---|---|
| *A63F 13/5258* | (2014.01) | |
| *A63F 13/53* | (2014.01) | |
| *A63F 13/58* | (2014.01) | |
| *A63F 13/88* | (2014.01) | |
| *A63F 13/816* | (2014.01) | |
| *A63F 13/55* | (2014.01) | |
| *G06F 9/451* | (2018.01) | |
| *G06F 3/0481* | (2013.01) | |

(52) U.S. Cl.
CPC ... *A63F 2300/69* (2013.01); *A63F 2300/8082* (2013.01); *G06F 3/04812* (2013.01); *G06F 9/451* (2018.02)

(56) References Cited

U.S. PATENT DOCUMENTS

| | | | |
|---|---|---|---|
| 6,817,979 | B2 | 11/2004 | Nihtila |
| 7,386,799 | B1 | 6/2008 | Clanton et al. |
| 8,001,472 | B2 | 8/2011 | Gilley et al. |
| 8,088,044 | B2 | 1/2012 | Tchao et al. |
| 2004/0127272 | A1* | 7/2004 | Park ................. A63B 69/00 463/6 |
| 2004/0179038 | A1 | 9/2004 | Blattner et al. |
| 2004/0250210 | A1 | 12/2004 | Huang et al. |
| 2005/0010845 | A1 | 1/2005 | Fenton et al. |
| 2005/0079905 | A1 | 4/2005 | Martens |
| 2005/0143174 | A1 | 6/2005 | Goldman et al. |
| 2005/0176502 | A1 | 8/2005 | Nishimura et al. |
| 2006/0134173 | A1* | 6/2006 | Liu ................. A61K 31/695 424/427 |
| 2006/0143569 | A1* | 6/2006 | Kinsella ............. G06Q 10/107 715/752 |
| 2007/0197274 | A1 | 8/2007 | Dugan |
| 2007/0218987 | A1 | 9/2007 | Van Luchene et al. |
| 2007/0298886 | A1* | 12/2007 | Aguilar, Jr. ........... G06N 3/006 463/42 |
| 2008/0077620 | A1 | 3/2008 | Gilley et al. |
| 2009/0144639 | A1 | 6/2009 | Nims et al. |
| 2009/0300525 | A1 | 12/2009 | Jolliff et al. |

FOREIGN PATENT DOCUMENTS

| | | |
|---|---|---|
| JP | H11-52834 A | 2/1999 |
| JP | 2000126334 A | 5/2000 |
| JP | 2002306660 A | 10/2002 |
| JP | 2005-506111 A | 3/2005 |
| JP | 2008033521 A | 2/2008 |
| WO | 2008002906 A2 | 1/2008 |

* cited by examiner

Running man

Medium energy

Jog/Wave

Unicycle

High energy

Shadow Boxing

Run/Hurdle

Dance

SYSTEM AND METHOD FOR CREATING AN AVATAR

CROSS REFERENCE TO RELATED APPLICATIONS

This application is a continuation of and claims priority to U.S. application Ser. No. 12/476,724, now U.S. Pat. No. 10,022,631, filed Jun. 2, 2009, entitled "System and Method for Creating an Avatar," which is a non-provisional application of and claims the benefit of priority from U.S. Provisional Application No. 61/058,174, entitled "SYSTEM AND METHOD FOR CREATING AN AVATAR," and filed Jun. 2, 2008, the content of which is incorporated herein by reference in its entirety.

BACKGROUND

A social network system or service focuses on the building and verifying of online social networks for communities of people who share interests and activities, or who are interested in exploring the interests and activities of others, and which necessitates the use of software. Most social network services are primarily web based and provide a collection of various ways for users to interact, such as chat, messaging, email, video, voice chat, file sharing, blogging, discussion groups, and so on. The main types of social networking services are those which contain directories of some categories (such as former classmates), means to connect with friends (usually with self-description pages), and recommender systems linked to trust. For example, and among myriad interests, a social networking service, or application thereof, may focus on athletes and athletics, members of which may interact regarding their athletic interests and activities. Social networking services may further include or describe a framework for application development. Such applications may interact with core social networking service functionality or other applications to customize the social networking service. For example, a social networking service user may include one or more applications to customize or extend the functionality of the social networking service.

Within the social networking service, a user may be represented by an avatar. Generally speaking, an avatar may be a graphical two-dimensional icon or a 3-dimensional model that may represent a user. An avatar may be as simple as a picture of the user or may be a graphical object that may represent the user's actions, beliefs, interests, appearance, identity, personality, and the like. An avatar may further be animated. In addition to representing the characteristics recited above, a user may opt to utilize an avatar—particularly a graphical icon or model—to maintain their anonymity while participating in and interacting with the social networking service and members thereof.

In addition to social networking services, an avatar may also be useful as part of a desktop widget, panel, gadget, or the like. In general, a widget, panel, gadget, and the like may be physically inspired applications or applets that provide desktop access to frequently used functions and/or information, for example clocks, calendars, news services, and the like.

BRIEF DESCRIPTION OF THE DRAWINGS

FIGS. 16 and 17 illustrate a social networking site in which an athletic performance avatar may be integrated.

DETAILED DESCRIPTION

Figure 1:
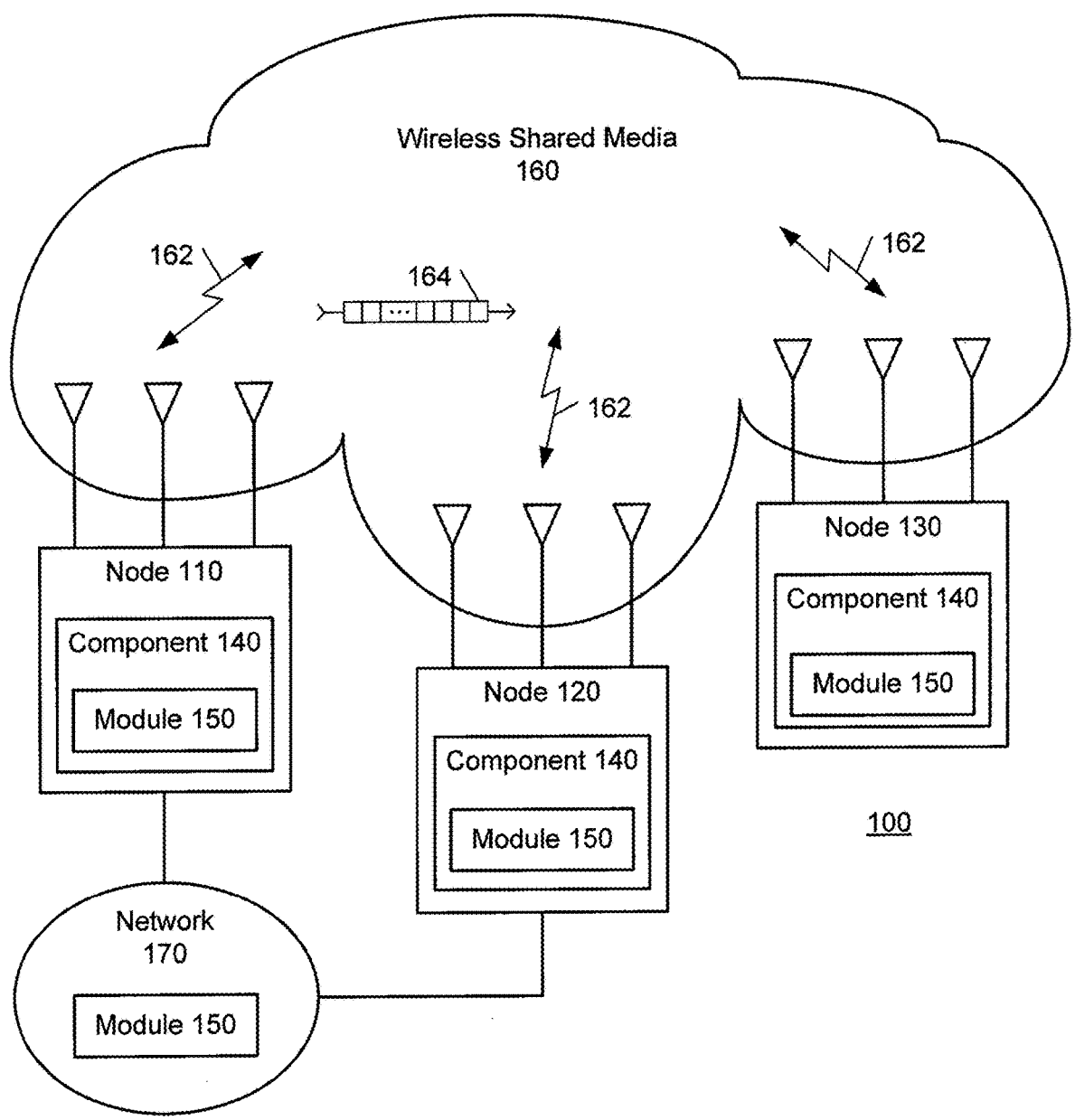
FIG. 1 illustrates a system of an embodiment.

Embodiments of a system and method for creating an avatar will be described. Reference will now be made in detail to a description of these embodiments as illustrated in the drawings. While the embodiments will be described in connection with these drawings, there is no intent to limit them to drawings disclosed herein. On the contrary, the intent is to cover all alternatives, modifications, and equivalents within the spirit and scope of the described embodiments as described herein.

Simply stated, an embodiment is an avatar or avatar environment to visualize data within a social network system or service, for example as part of the Internet, and/or within a desktop widget, panel, gadget, or the like. The avatar may further evolve or alter its appearance, animation, or other visual or audio characteristics in response to the data or other input. In particular, the avatar of an embodiment may respond to and provide visualization of athletic or sport performance data.

FIG. 1 illustrates an embodiment of a system 100. In an embodiment, system 100 is a social networking system. In various embodiments, the system 100 may comprise multiple nodes. A node generally may comprise any physical or logical entity for communicating information in the system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, a node may comprise, or be implemented as, a computer system, a computer sub-system, a computer, an appliance, a workstation, a terminal, a server, a personal computer (PC), a laptop, an ultra-laptop, a handheld computer, a personal digital assistant (PDA), a set top box (STB), a telephone, a mobile telephone, a cellular telephone, a handset, a wireless access point, a base station (BS), a subscriber station (SS), a mobile subscriber center (MSC), a radio network controller (RNC), a microprocessor, an integrated circuit such as an application specific integrated circuit (ASIC), a programmable logic device (PLD), a processor such as general purpose processor, a digital signal processor (DSP) and/or a network processor, an interface, an input/output (I/O) device (e.g., keyboard, mouse, display, printer), a router, a hub, a gateway, a bridge, a switch, a circuit, a logic gate, a register, a semiconductor device, a chip, a transistor, or any other device, machine, tool, equipment, component, or combination thereof. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java™, BASIC, Perl™, Matlab™, Pascal, Visual BASIC™, assembly language, machine code, micro-code for a network processor, and so forth. The embodiments are not limited in this context.

The nodes of the system 100 may be arranged to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The media and control information may be communicated from and to a number of different devices or networks.

The system 100 may include one or more nodes (e.g., nodes 110-130) arranged to communicate information over one or more wired and/or wireless communications media. Examples of wired communications media may include a wire, cable, printed circuit board (PCB), backplane, switch fabric, semiconductor material, twisted-pair wire, co-axial cable, fiber optics, and so forth. An example of a wireless communication media may include portions of a wireless spectrum, such as the radio-frequency (RF) spectrum. In such implementations, the nodes of the system 100 may include components and interfaces suitable for communicating information signals over the designated wireless spectrum, such as one or more transmitters, receivers, transceivers, amplifiers, filters, control logic, antennas and so forth.

The communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), a line card, a disc controller, video controller, audio controller, and so forth.

In various embodiments, the communications system 100 may comprise or form part of a network, such as a WiMAX network, a broadband wireless access (BWA) network, a WLAN, a WMAN, a wireless wide area network (WWAN), a wireless personal area network (WPAN), a Code Division Multiple Access (CDMA) network, a Wide-band CDMA (WCDMA) network, a Time Division Synchronous CDMA (TD-SCDMA) network, a Time Division Multiple Access (TDMA) network, an Extended-TDMA (E-TDMA) network, a Global System for Mobile Communications (GSM) network, an Orthogonal Frequency Division Multiplexing (OFDM) network, an Orthogonal Frequency Division Multiple Access (OFDMA) network, a North American Digital Cellular (NADC) network, a Universal Mobile Telephone System (UMTS) network, a third generation (3G) network, a fourth generation (4G) network, a local area network (LAN), a wide area network (WAN), a metropolitan area network (MAN), the Internet, the World Wide Web, a cellular network, a radio network, a satellite network, and/or any other communications network configured to carry data. The embodiments are not limited in this context.

In an embodiment, system 100 may include node 130. Node 130 may comprise, for example, a mobile device or a fixed device having wireless capabilities. A mobile device may comprise a generalized equipment set providing connectivity to other wireless devices, such as other mobile devices or fixed devices. Examples for node 130 may include a computer, server, workstation, notebook computer, handheld computer, telephone, cellular telephone, personal digital assistant (PDA), combination cellular telephone and PDA, and so forth.

Nodes 110-130 may have one or more wireless transceivers and wireless antennas. In one embodiment, for example, nodes 110-130 may each have multiple transceivers and multiple antennas to communicate information signals over wireless shared media 160. For example, a channel 162, link, or connection may be formed using one or more frequency bands of wireless shared medium 160 for transmitting and receiving packets 164. The embodiments are not limited in this context.

Figure 2:
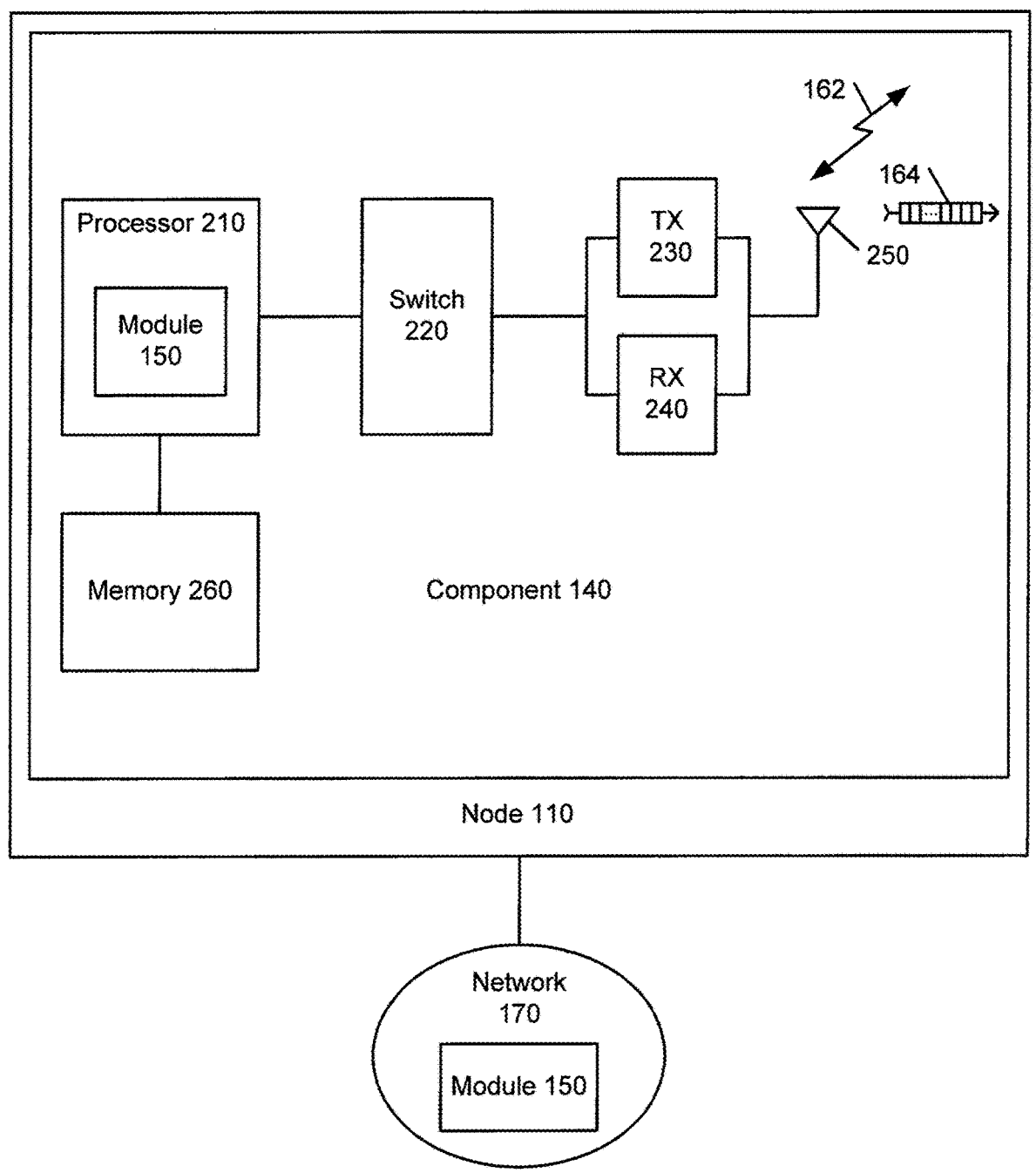
FIG. 2 illustrates a social network service node of an embodiment.

FIG. 2 more specifically illustrates node 110 of the communications system 100. As shown in FIG. 2, the node may comprise multiple elements such as component 140, module 150, processor 210, memory 260, switch 220, transmitter 230, receiver 240, and antenna 250 to communicate packets 164 over wireless shared media 160. Transmitter 230 and receiver 240 may also be collectively referred to as a transceiver. Some elements may be implemented using, for example, one or more circuits, components, registers, processors, software subroutines, or any combination thereof. Although FIG. 2 shows a limited number of elements, it can be appreciated that additional or fewer elements may be used in node 110 as desired for a given implementation. The embodiments are not limited in this context.

As noted, in an embodiment, node 110 may include a processor 210. Processor 210 may be connected to switch 220 and/or the transceiver (i.e., transmitter 230 and receiver 240). Processor 210 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In an embodiment, for example, processor 210 may be implemented as a general purpose processor. Processor 210 may also be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments are not limited in this context.

In one embodiment, processor 210 may include, or have access to, memory 260. Memory 260 may comprise any machine-readable media. Memory 260 may be implemented using any machine-readable or computer-readable media capable of storing data, including both volatile and non-volatile memory. For example, memory 260 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 260 may be included on the same integrated circuit as processor 210, or alternatively some portion or all of memory 260 may be disposed on an integrated circuit or other medium, for example a hard disk drive, that is external to the integrated circuit of processor 210. The embodiments are not limited in this context.

When implemented in a node of system 100, node 110 may be arranged to communicate information over wired or wireless communications media between the various nodes, such as nodes 120 and 130. The information may be communicated in the form of packets 164 over wireless shared media 160, with each packet 164 comprising media information and/or control information. A packet 164 in this context may refer to any discrete set of information, including a unit, frame, cell, segment, fragment, and so forth. The packet may be of any size suitable for a given implementation. The embodiments are not limited in this context.

In an embodiment for which system 100 is a social networking system, module 150 may include an avatar module. As introduced, an avatar may be any representation or manifestation including but not limited to a static or animated picture of a user, or the avatar may be a graphical object that may represent the user's actions, beliefs, interests, appearance, identity, personality, and the like when the user participates in and interacts with a social network. The avatar module of an embodiment may allow a user to select a pre-designed avatar representative of themselves for use in the social networking system or service. The user may further customize or otherwise alter the pre-designed avatar (e.g., color scheme and the like) to generate a more desirable representation of themselves. The avatar module of an alternate embodiment may allow the user to upload or otherwise create an avatar of substantially or entirely custom design.

Once the user has selected or generated a suitable avatar, the user may participate with and interact with a social networking system or service. The avatar may represent the user in myriad ways depending on the configuration or purpose of the social networking system or service. For example, in an embodiment the social networking system or service may allow the user to send a message to or post a comment for another user. The message or comment may be accompanied by the avatar of the sender, and may or may not represent the identity of the sender. The avatar may further represent the user in a web log (i.e., blog) or other similar self comment. Further still, the avatar may represent the athletic performance or abilities of the user, or a comparison of the athletic performance or abilities to other user(s) or benchmark(s).

For example, in an embodiment a social networking system or service may contain an application, plug-in, or the like to track, monitor, and/or visually display athletic or sport performance data of a user or multiple users. One such application, plug-in, or the like may relate to comparing the athletic performance of the social networking system user to a benchmark or to the athletic performance of other social networking system or service members. Multiple users interacting with the application may accordingly compete based on their athletic performance. The benchmark comparison and/or multiple user competition may be visually represented, in particular with the avatar(s) of the user(s).

For example, each user may select a pre-designed avatar, may customize the pre-designed avatar, or may upload or otherwise create an avatar as introduced above. Thereafter, each user may be represented by their respective avatars while interacting with and participating in the social networking system or service. In an embodiment in which multiple users are competing based on their athletic performance, the competition may be visually displayed or represented by the users' avatars. In an embodiment, for example, the competition may be represented by displaying multiple avatars (i.e., of multiple social network users) in the same screen, frame, window and the like. Further, the avatar position in the frame may represent the relative athletic performance of the corresponding user compared to other users participating in the competition.

In an embodiment, the competition may represent the total distance walked, jogged, run, etc. by each user after a common starting point. It is to be understood that other performance metrics (e.g., weight lifted, calories burned, duration of aerobic training, frequency of aerobic training, etc.) may be represented by the competition. Total distance walked, jogged, or run (or other performance metric) may be represented by the horizontal or vertical position of each avatar within the screen, frame, window, and the like. For example, total distance traversed by a user may be represented by horizontal position within the screen, frame, or window, with total distance traversed increasing from left to right across the screen, frame, or window (i.e., in an increasing distance from the origin or starting point of the competition as represented by a Cartesian coordinate system). Accordingly, an avatar displayed to the right of another avatar visually indicates that the former user is leading the latter user in the competition.

Further, the screen, frame, or window may represent a partial or zoomed view of the competition. In particular for competitions involving more than a few participants, the screen, frame, or window may only simultaneously display the progress of a portion of the participants so that the relative position of the avatars may be visually resolved. For example, the competition may represent the walking, jogging, or running progress of the users toward a goal of 100 miles. Each user's screen, frame, or window displaying their avatar may represent fewer than the 100 miles. More specifically, the screen, frame, or window of a user who has traversed 50 miles may only include the avatars of those users who have traversed a predefined portion of the 50 miles, for instance 45 to 55 miles. Accordingly, that user may have a visual representation of their closest competitors. In an embodiment, the domain of a user's screen, frame, or window (i.e., width of the screen, frame, or window in miles for this example) may adjust to display only a predetermined number of avatars. Alternatively or additionally, the user may have a visual representation of a particular portion of the competition (e.g., the last 50 meters of a race track).

However, in an embodiment a user may alternatively or additionally wish to have a visual representation of the entire competition. For such an embodiment, a portion of the user's screen, frame, or window may include a representation of the entire competition as well as their specific location within the entirety. For example, the top or bottom of the user's screen, frame, or window may include a scroll bar or the like that allows the user to control (e.g., with a mouse click or rollover) the portion of the competition that will be displayed. Further, the scroll bar may include tick marks or other indicia of the progress of some or all of the users participating in the competition. A user may therefore know their progress compared to other users in the competition as well as having a visual representation of at least their closest competitors based on the relative position of the avatars within the screen, frame, or window. In an embodiment, the screen, frame, or window may visually respond to the user rolling over the tick marks or indicia with the display name or other identifier of the other users. The visual response may further include the progress (in an embodiment distance traversed) of the other users in addition to or in lieu of the display name or other identifier of those users. Finally, the scroll bar may include an arrow, color differentiation, or other similar pointer to the location of the individual user viewing the screen, frame, or window within or adjacent to the competition scroll bar to determine their progress in the competition.

Figure 3:
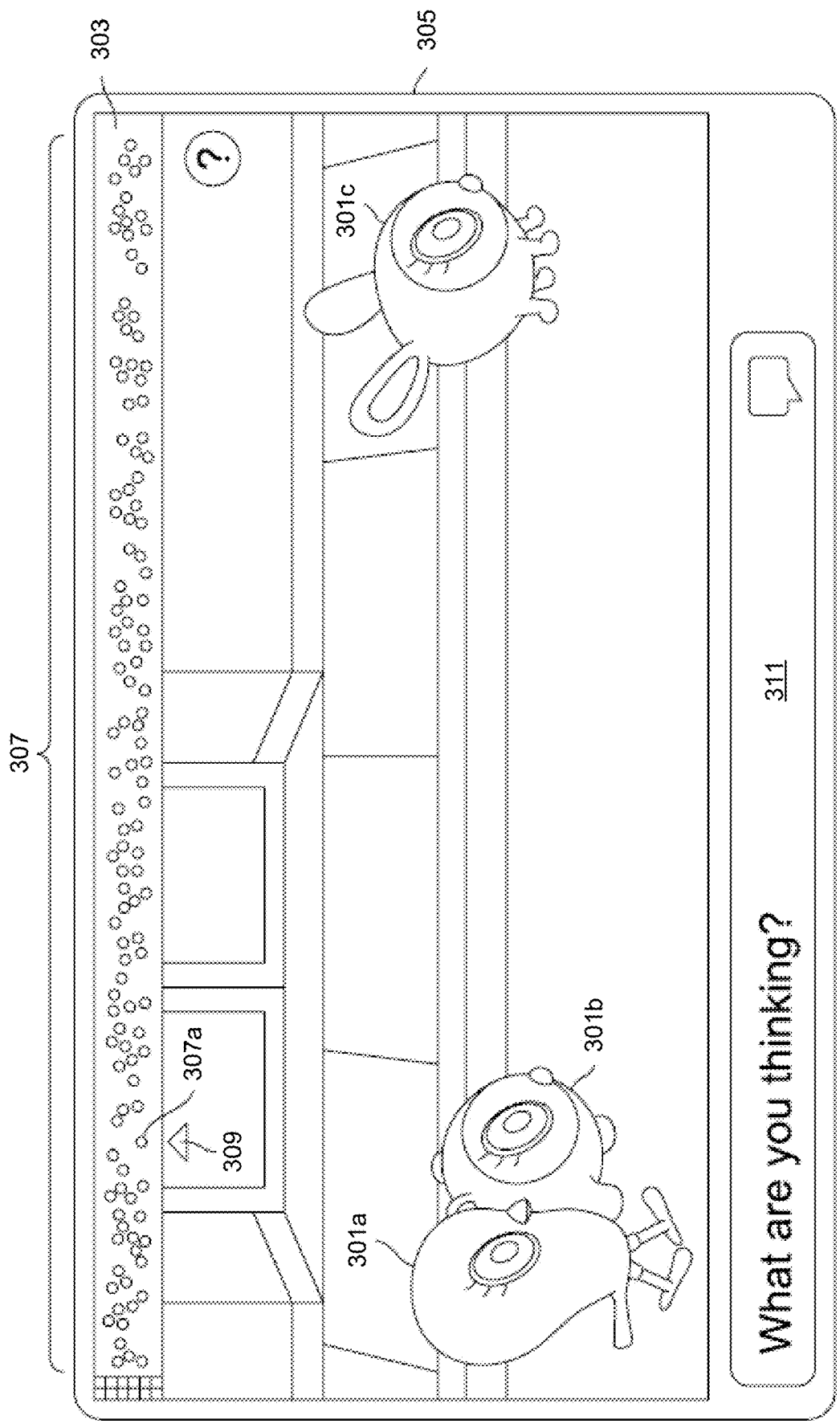
FIG. 3 illustrates a screen shot of the application of an embodiment.

FIG. 3 illustrates a screen shot of an exemplary embodiment according to the description above. Three avatars 301 representing three users are displayed in various locations within the application window. More specifically, the three avatars 301 appear at various depths in the foreground against a background. In an embodiment, the background may be a running track, a street marathon course, a trail, or any other background related to walking, jogging, or running. The background may further represent a weight room, gymnasium, or any other suitably related backgrounds should the athletic performance of the user relate to weight training, aerobic training, and the like. Alternatively, the background may be completely arbitrary or whimsical to contribute to the departure of the overall avatar environment from reality. As illustrated, the middle avatar 301*b* represents the user who is executing and viewing the avatar application. The avatar 301*c* to the right represents the user immediately ahead in the competition or race while the avatar 301*a* to the left represents the user immediately behind in the competition or race.

The top of the application includes a scroll bar 303 representing at least a portion of the competition or race. In an embodiment, the scroll bar 303 represents the entire race from beginning to end while the remainder 305 of the window (i.e., the portion of the application window including the avatars) might only display a graphical representation of a portion of the entire race. The location of some or all of the users participating in the competition or race may be displayed in the scroll bar as tick marks, dots, or other similar indicia (e.g., ticks 307). Further, the location of the user executing and viewing the avatar application may be highlighted by an arrow 309 or other pointer. The tick mark 307*a*, dot, or other similar indicium may further still have a color, size, or shape that differentiates it from others. As discussed above, the user may roll over or otherwise select a tick mark, dot, or other indicium to display the corresponding user name, identity, and/or progress within the competition or race.

In an embodiment, one or both of the background and the avatars 301 may be animated. For example, the background may scroll (in the illustrated example from right to left) as a visual cue that the avatars 301 represent users' progress in walking, jogging, or running during a race or competition.

Further, the avatars 301 may appear to be walking, jogging, running, or otherwise in motion. More specifically, the avatar animation may relate to the athletic performance of the user represented by the avatar. For example, a user who has run frequently, with substantial duration, and/or a substantial distance may be represented by an avatar whose animation mimics or suggests a fast running pace. Conversely, a user who has walked infrequently with little duration and/or distance may be represented by an avatar whose animation mimics or suggests a slow walking pace. In an embodiment, an inactive user may even be represented by an avatar sitting down or otherwise lacking animation. The animation of the avatar may reflect the most current athletic performance of the user (e.g., within a particular time period) or may reflect an average (including a moving average) over the duration of the entire race or competition. Accordingly, the avatar animation may reflect a trend in the corresponding user's athletic performance in addition to or in lieu of their position in the overall race.

While participating in the race or competition, a user may generate a comment by inputting text and/or symbols in a comment entry box. As illustrated in FIG. 3, the comment entry box 311 (in an embodiment containing the prompt "What are you thinking?") is located adjacent to and below the race or competition area defined by the background and the avatars 301 superimposed thereon. When a user inputs a comment in entry box 311, a dialogue box, bubble or the like will pop up or otherwise appear adjacent to the avatar within the application representing the user from whom the comment initiated. In an embodiment, the comment will be visible to other users whose avatars 301 are in the same window or frame of the race or competition. Further, an indication may appear in the scroll bar should a user post a comment whose avatar is not within the same window or frame of the race or competition. Any user may then roll over or select the tick mark, dot, or other similar indicium (e.g., mark 307*a*) of the commenting user/avatar to review the comment. In another embodiment, additional avatars (not shown) may be introduced into a race or competition representing professional athletes or in the form of "avatar trainers" that may offer motivational messages or other commentary.

In addition to the current position or standing, the avatar application may also display standings, a leader board, trophies, and the like depending on the outcome of a race or competition. Further, the avatar application may display milestones, achieved goals, and the like for a user who is not part of a race or competition but has otherwise established personal achievement benchmarks.

Figure 4:
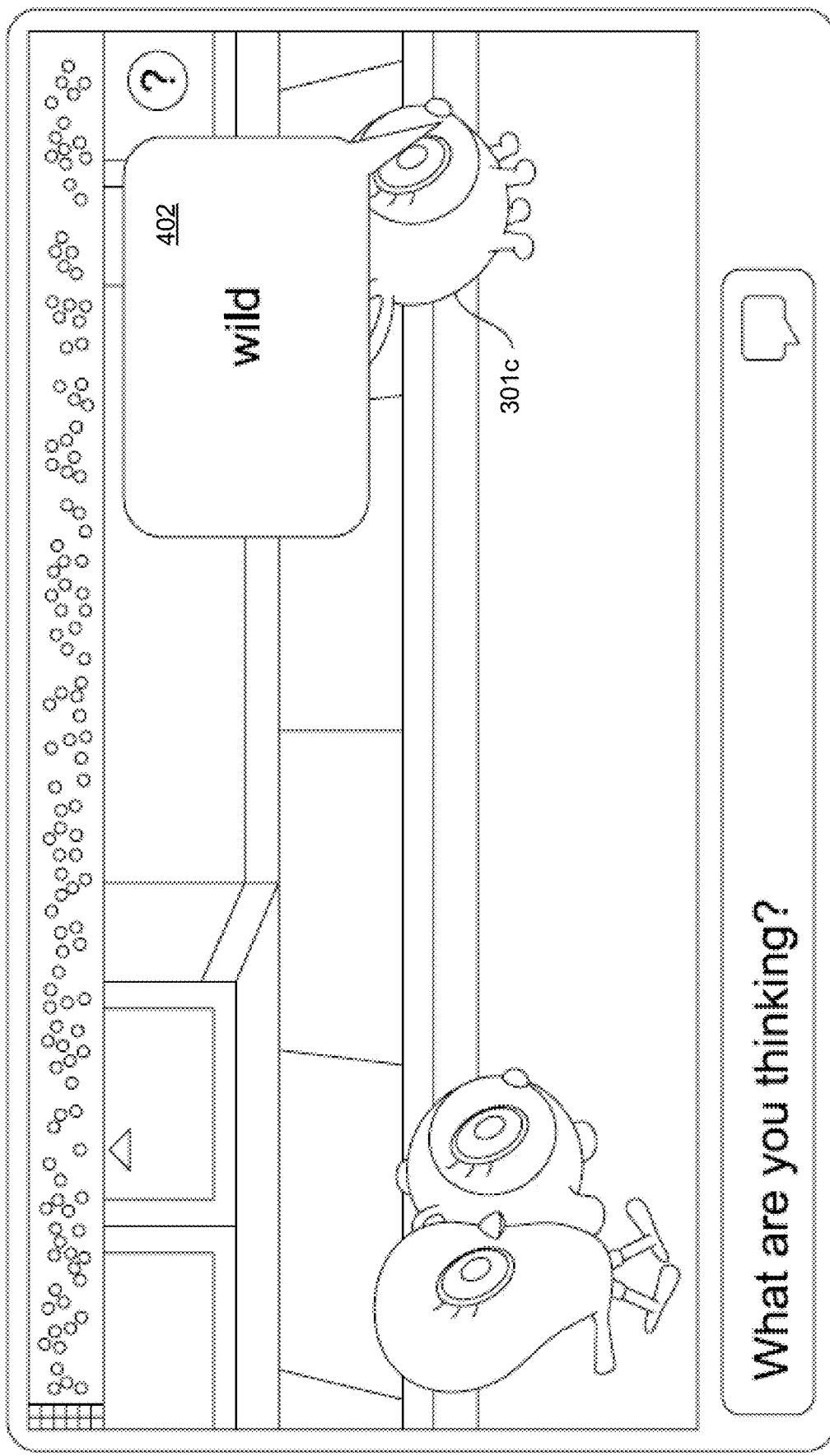
FIG. 4 illustrates an alternate screen shot of the application of an embodiment.

FIG. 4 illustrates a dialogue bubble 402 appearing and extending from avatar 301*c* upon entry of a comment (i.e., "wild") submitted by the user associated with avatar 301*c*. In an embodiment, the comment will be visible to other users whose avatars are in the same window or frame of the race or competition. Further, an indication (not shown) may appear in the scroll bar should a user post a comment whose avatar is not within the same window or frame of the race or competition. Any user may then roll over or select the tick mark, dot, or other similar indicium of the commenting user/avatar to review the comment. In another embodiment, additional avatars may be introduced into a race or competition representing professional athletes or in the form of "avatar trainers" that may offer motivational messages or other commentary.

As noted, the avatar position, appearance, and/or animation may reflect the athletic performance of the user. The user's athletic performance may in turn originate in a variety of ways. In an embodiment, the user may input their athletic performance. For example, they may input a particular distance run in a particular time for each instance of aerobic activity. They may alternatively input pounds lifted, games played, and the like depending on the nature of the race, competition, or comparison to benchmarks or goals.

Alternatively, the avatar module may communicate with one or more athletic performance databases or other athletic performance data collection modules or utilities. For example, numerous Internet-based or online services collect athletic performance data from users. In particular, certain Internet-based or online services may interoperate with sensors or other recording devices that a user may wear or carry while working out, walking, jogging, running etc. In an embodiment, the athletic performance data may be collected with a pedometer, heart rate monitor, calorie monitor and the like as are well known in the art.

Non-athletes or users not represented by an avatar within the race or competition may also execute the application and interact with the athletes or users represented by an avatar within the race or competition. For example, a non-athlete or user not represented by an avatar within the race or competition may send or post messages or comments, deliver gifts, or otherwise communicate with one or more athletes or users represented by avatars within the race or competition. Further, the non-athlete or user not represented by an avatar within the race or competition may establish goals or milestones for an athlete.

Figure 5:
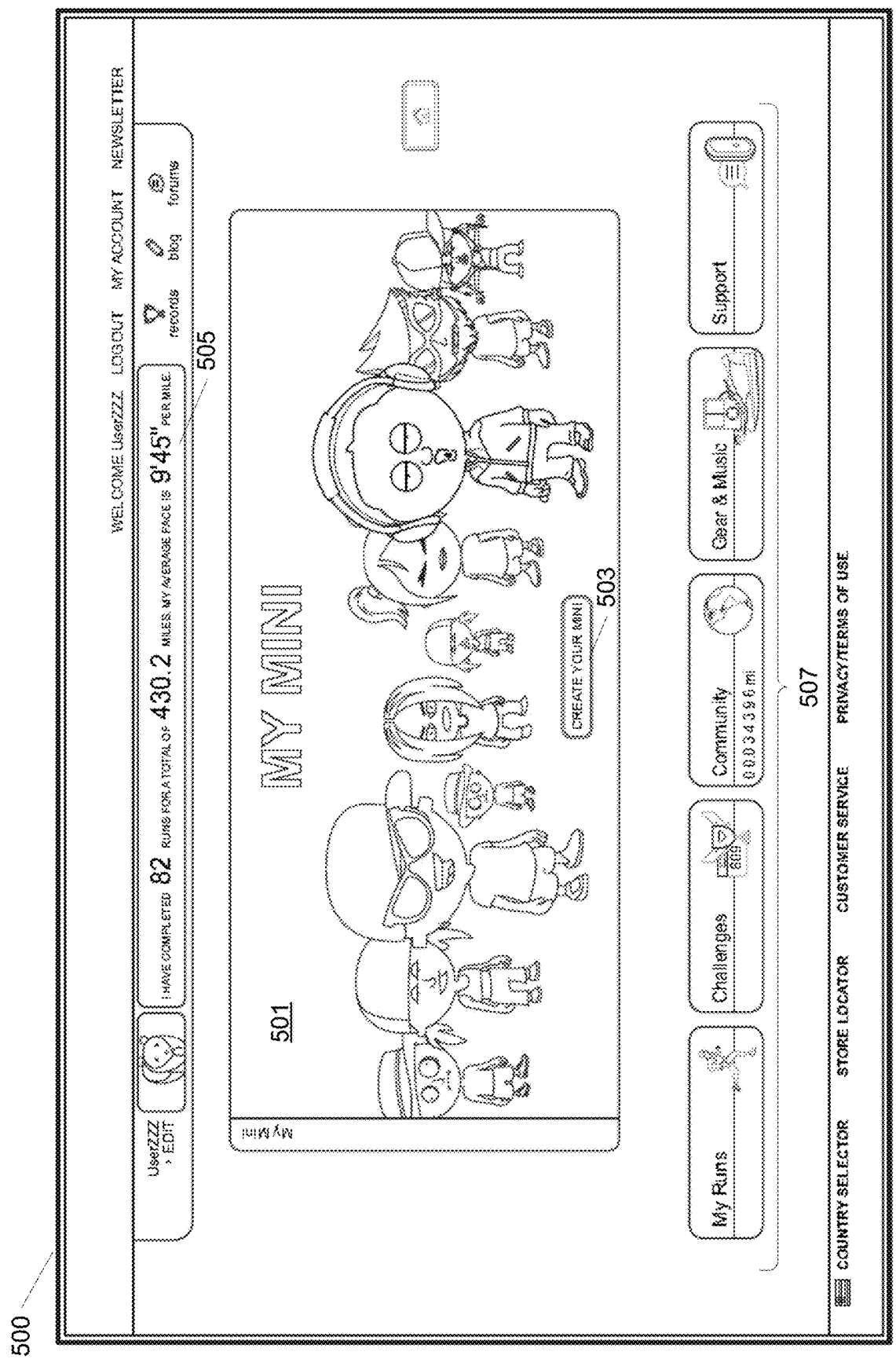
FIG. 5 illustrates an example introduction screen in which a user may choose to create an avatar.

FIGS. 5-18 illustrate an alternate avatar module and/or a user interface associated therewith. More specifically, FIGS. 5-18 illustrate a user interface 500 that may allow a user or athlete to select or generate an avatar design. FIG. 5, for example, illustrates an introduction screen 501 that allows a user to create an avatar using option 503. Images of example avatars may be displayed in a background of screen 501. A user's athletic performance statistics may also be displayed in information bar 505. Other options such as accessing gear and music or contacting support may be provided in portion 507 of interface 500.

Figure 6:
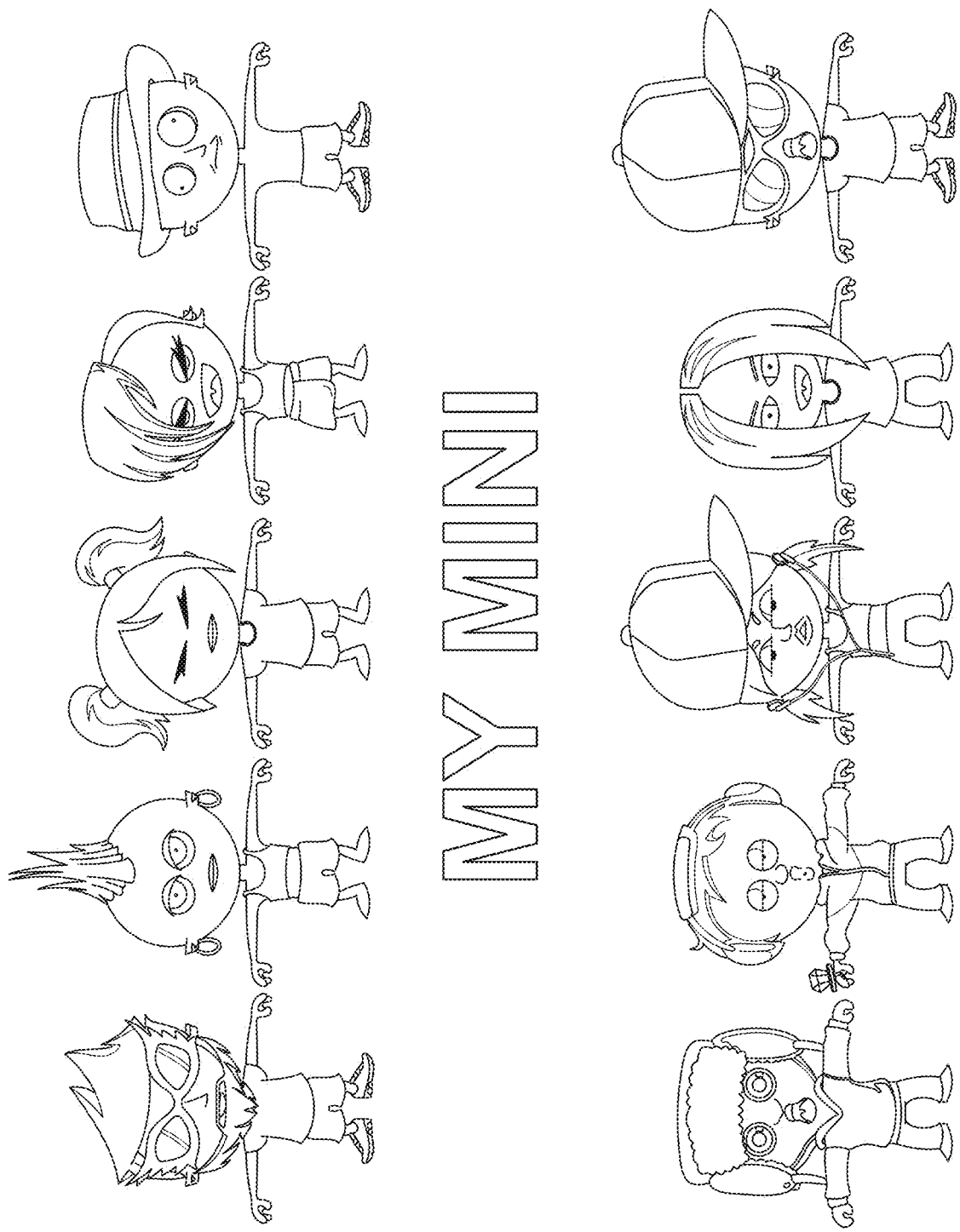
FIG. 6 illustrates an example initial avatar selection screen.

Upon selecting option 503 to create an avatar, the user may be presented with an initial creation interface. FIG. 6, for example, illustrates an exemplary set of avatar archetypes from which the user or athlete may initially choose, and/or an exemplary set of avatars that have been created. In an embodiment, the user or athlete may thereafter modify, customize, or otherwise personalize the avatar they have selected.

Figure 7A:
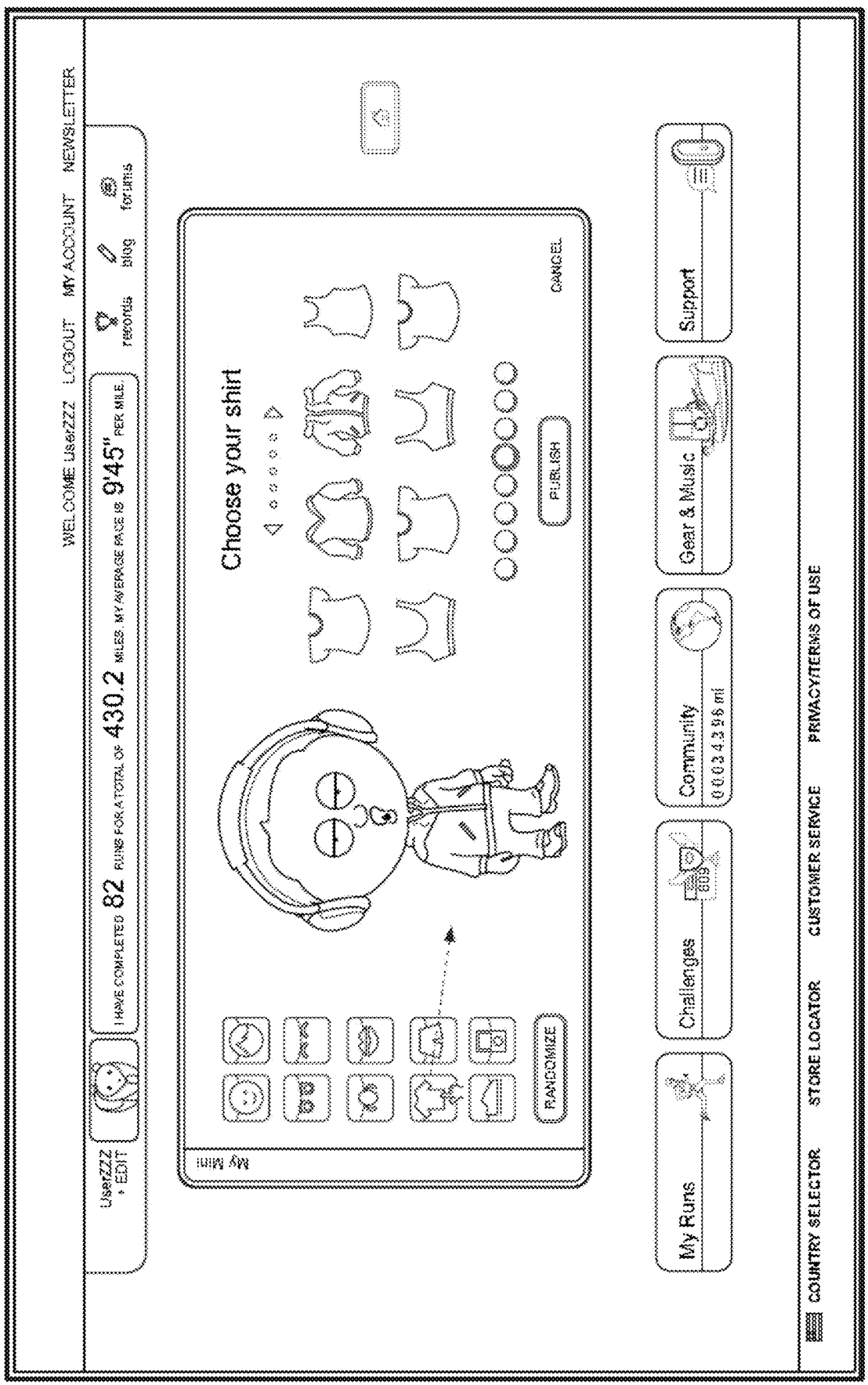
FIGS. 7A & 7B illustrate example avatar customization interfaces.

FIG. 7A illustrates a number of ways in which the user or athlete may customize their avatar once a particular avatar archetype (e.g., as illustrated by FIG. 6, though not limited in this context) has been selected. For example, the user or athlete may select a facial expression, a hair style and color, eye shape and color (including glasses and sunglasses and the style and color thereof), eyebrow shape and color, body shape, mouth shape and/or expression, shirt or other upper body garment style and color, shorts or other lower body garment style and color, shoe style and color, and music related to the avatar. For example, a particular song of playlist of songs may be related to the avatar. Further, the avatar may be displayed wearing earphones or the like. In an embodiment, the avatar may only be displayed with headphones if the user or athlete has associated a song and/or playlist of songs with their avatar. In some instances, some choices for the various characteristics of the avatar might not be immediately available. Instead, the user might be required to achieve some goal prior to obtaining access to those choices.

More specifically, FIG. 7A illustrates the user interface 500 of an embodiment with which the user or athlete may modify, customize, or otherwise personalize their avatar. The user or athlete may select an icon pertaining to the customizable items summarized above. Here, the user or athlete has selected to modify, customize, or otherwise personalize the upper body garment worn by the avatar. For example, the user may select from a variety of upper body garments including a t-shirt, a pull-over sweatshirt (with or without a hood), a zippered sweatshirt or jacket (with or without hood), a tank top, a sports/athletic support bra, or any other upper body garment that may be worn. In an embodiment, the selection of the upper body garment (or any other customizable item) may be gender-specific if, for example, the avatar archetypes have a gender. Alternatively, in an embodiment for which the avatar archetypes are gender neutral, the user or athlete may select from any available customizable item configurations. Once the user or athlete has selected an upper body garment type (here, a t-shirt), they may thereafter select the color and/or color combination/pattern for the t-shirt. The user or athlete may continue to modify, customize, or otherwise personalize their avatar until they are satisfied with the appearance of their avatar. In a further embodiment, the user or athlete may randomize the appearance of their avatar (e.g., by way of the "randomize" button of user interface 500). If desired, the user or athlete may thereafter modify, customize, or otherwise personalize the randomly generated avatar.

Figure 7B:
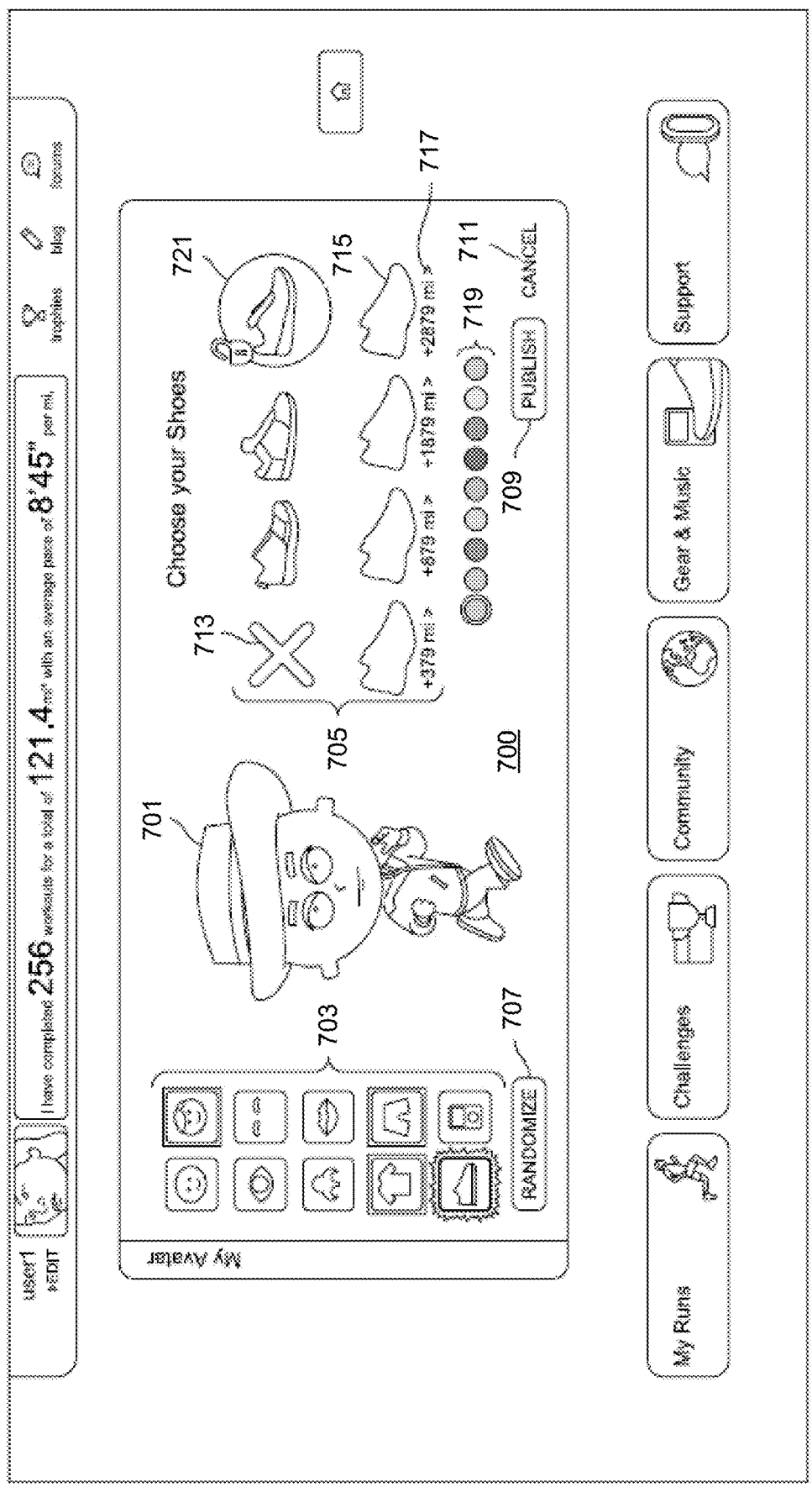

FIG. 7B illustrates another example interface for customizing an avatar. Interface 700 may initially display a default avatar 701, feature categories 703, specific features 705, a randomize option 707, a publish option 709 and a cancel option 711. Starting from default avatar 701, a user may modify various characteristics such as hair style or color, facial expression, lips, eye brows, eyes, nose, shirt, pants, shoes and accessories. Although not illustrated, other characteristics may also be modifiable. For example, in some embodiments, an avatar's body shape, ears and hands may be customized. Using categories 703, each of the above mentioned characteristics may be customized according to the user's preference. In one example, and as illustrated, a user may modify the shoes that avatar 701 is wearing. In particular, specific features 705 include a variety of shoes that are available to the user for his or her avatar. In some instances, new shoes or other features might only be available upon completion of a certain challenge, action, goal or the like. The shoes available for the avatar could also correspond to a latest actual shoe model offered by a shoe manufacturer or some other shoe design currently in fashion among users. The unavailable shoes 715 or other feature might be shown in a dark outline (i.e., without significant details) along with the goal 717 that needs be met. For example, some shoes might not be available for selection until a user has run a specified distance. A user may further select the 'X' option 713 if he or she wishes to remove shoes from avatar 701. Additionally, a user may select a color of the shoe or other feature being customized using color palette 719. An unlocked lock symbol 721 next to or otherwise associated with a selectable feature may indicate that the selectable feature is newly available to the user.

In an embodiment, while the user or athlete is building their avatar, the avatar may be animated. For example, the animations may relate to the items with which the user or athlete is modifying, customizing, or otherwise personalizing their avatar. Accordingly, the animation may include tying a shoe or zipping a hooded sweatshirt if the user or athlete is customizing those items. Alternately or additionally, the animation may relate to the avatar archetype that the user or athlete has selected and/or the combination of items worn by and/or included with the avatar. The animation may also relate to facial expressions associated with the avatar. Further still, at least a component of the animation may be whimsical, random, or otherwise arbitrary. The animation of the avatar during the user's or athlete's creation thereof may contribute to the user or athlete identifying with the avatar and/or provide the user or athlete with a heightened sense of avatar personalization.

Figure 8:
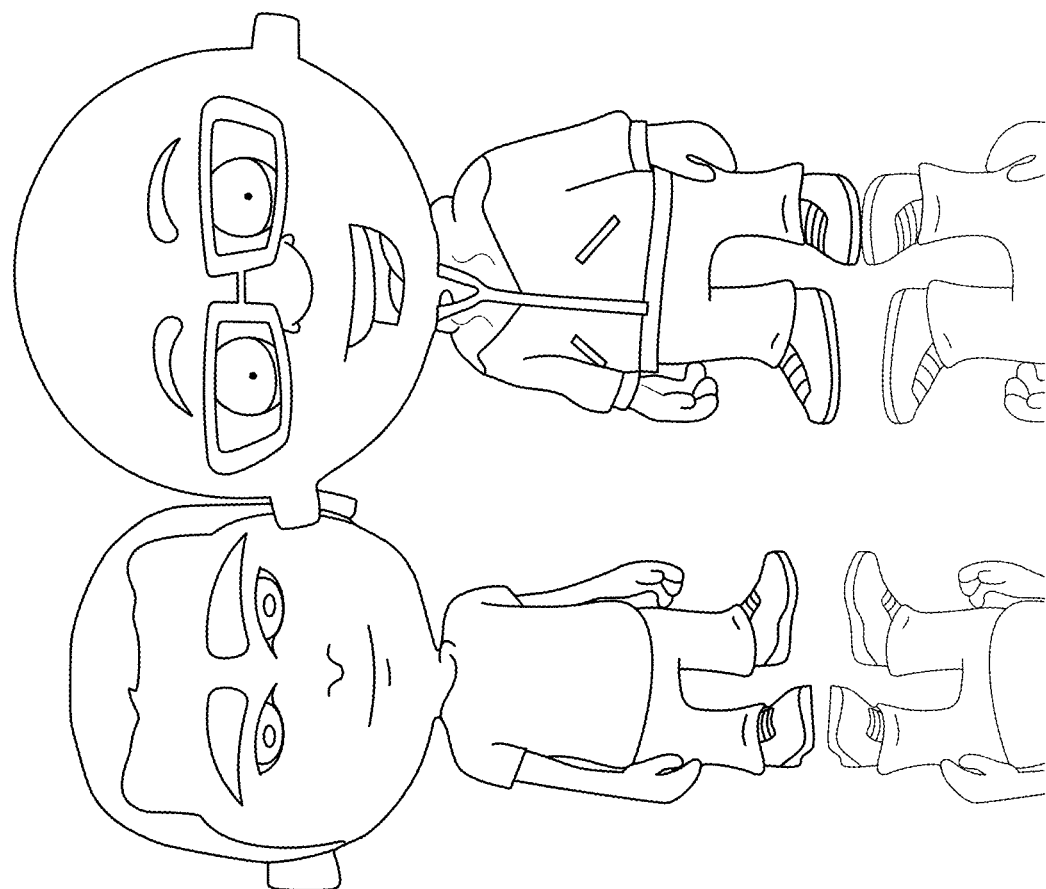
FIG. 8 illustrates two example avatars.
Figure 9A:
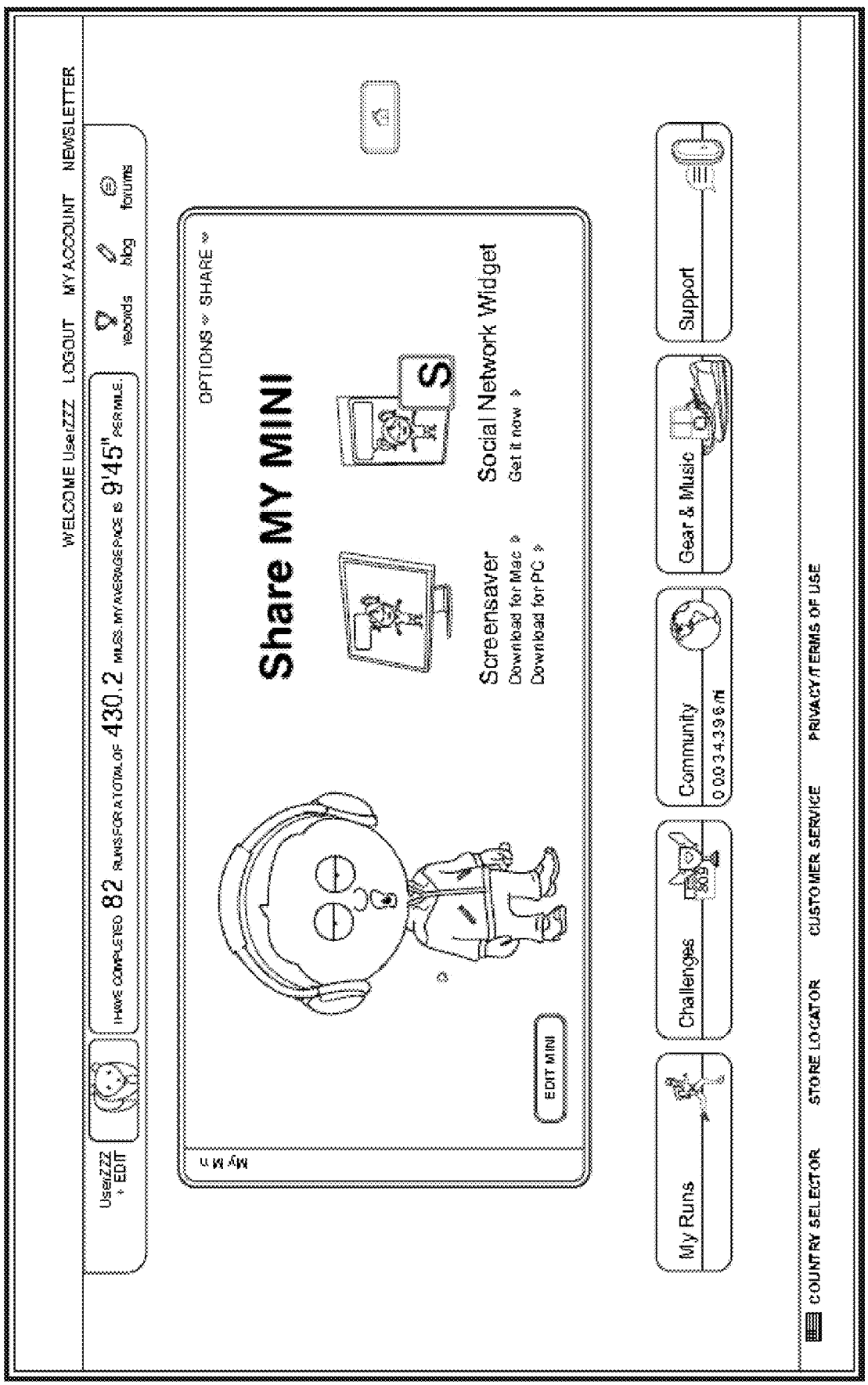
FIGS. 9A & 9B illustrate example sharing and publishing interfaces for publicizing the user's avatar.
Figure 9B:
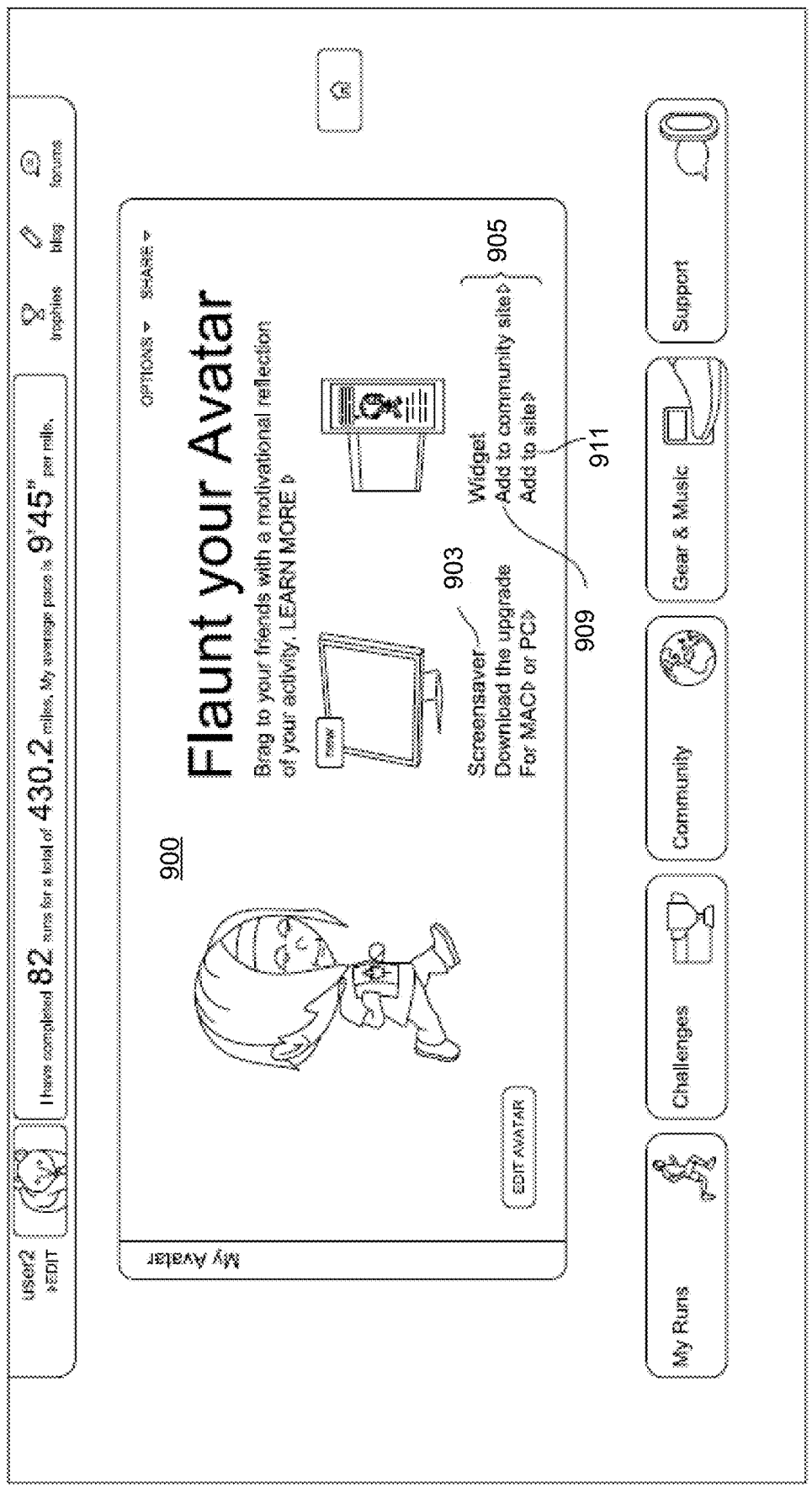

Once the user or athlete has created an avatar, they may publish it (e.g., using option 309). In doing so, the user or athlete may thereafter be represented by their avatar within one or more social networking services as introduced above and/or within a social networking service or desktop widget, panel, gadget, or the like. FIG. 8 illustrates two such exemplary avatars. More specifically, FIG. 9A illustrates one embodiment in which a user or athlete may share their avatar in a variety of ways. For example, the user or athlete may share their avatar as a screensaver and/or as a widget within a social networking service. FIG. 9B illustrates another example publishing interface 900 through which a user may elect to publish and download a screensaver featuring the user's avatar through option 903 or to generate a widget that may be included in various sites using option 905. For example, a user may add the avatar to a specified or predefined community site using option 909 or another site using option 911.

Figure 10:
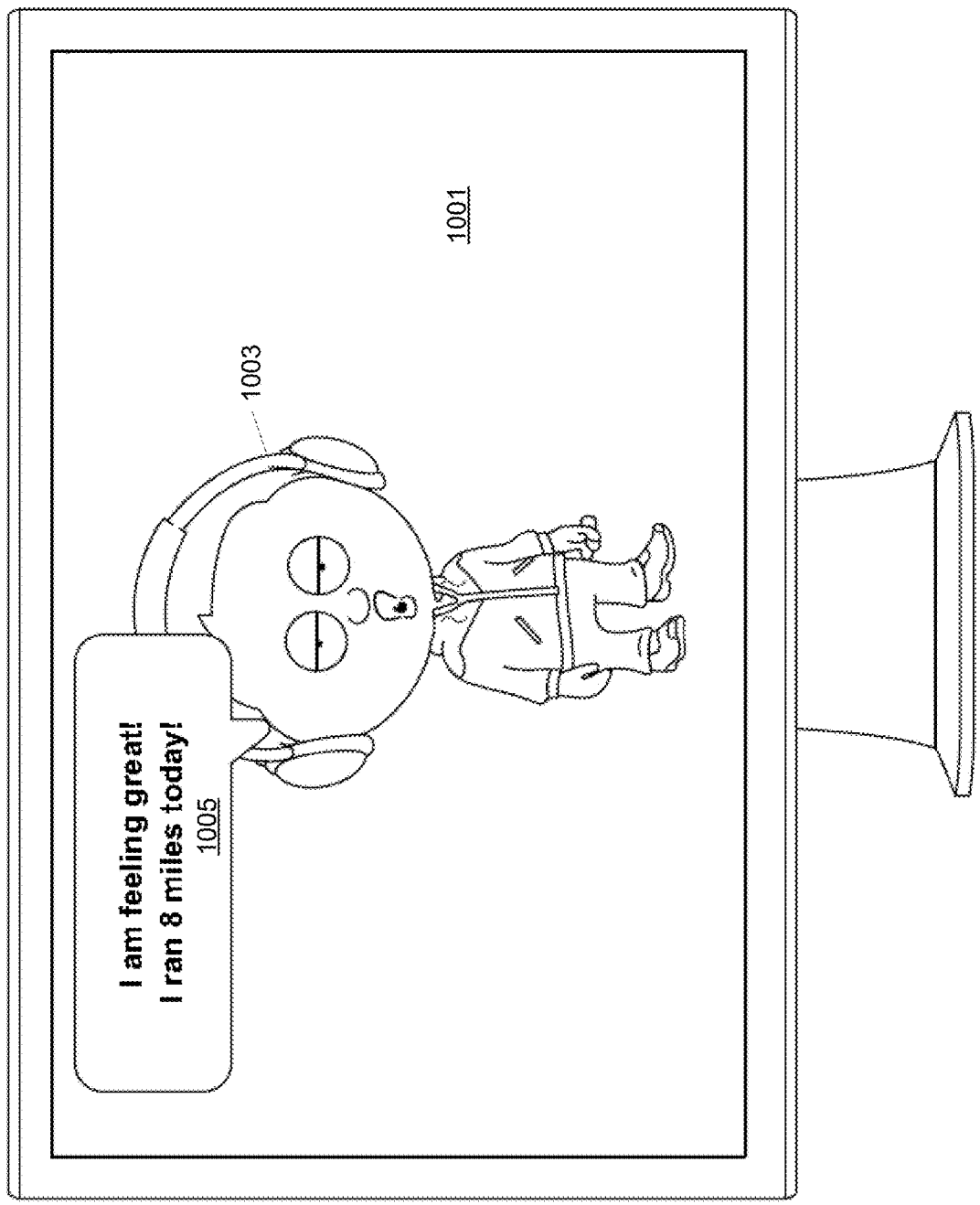
FIG. 10 illustrates a screensaver featuring an avatar.

As noted above, the avatar of an embodiment may reflect the athletic performance of the user or athlete as collected by one or more athletic performance sensors, input by the user or athlete, or a combination thereof. For example, FIG. 10 illustrates the avatar of an embodiment as part of a desktop screen saver 1001. The avatar 1003 may display (e.g., in the form of a dialogue box or bubble) a message 1005 or the like indicative of the user's or athlete's recent athletic performance. The message 1005 may be complementary or motivational depending on the athletic performance or the user or athlete (e.g., as compared to an athletic benchmark, milestone, challenge performance, competition/race performance, and/or personal goal provided by the user or athlete and/or their training program) and may be automatically determined and/or generated by a computing device.

Figure 11:
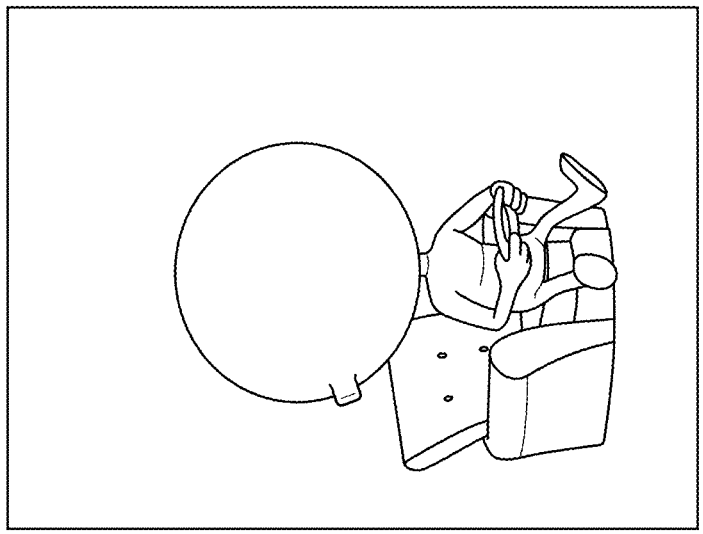
FIGS. 11-13 illustrate example avatar animations for different levels of energy.
Figure 11:
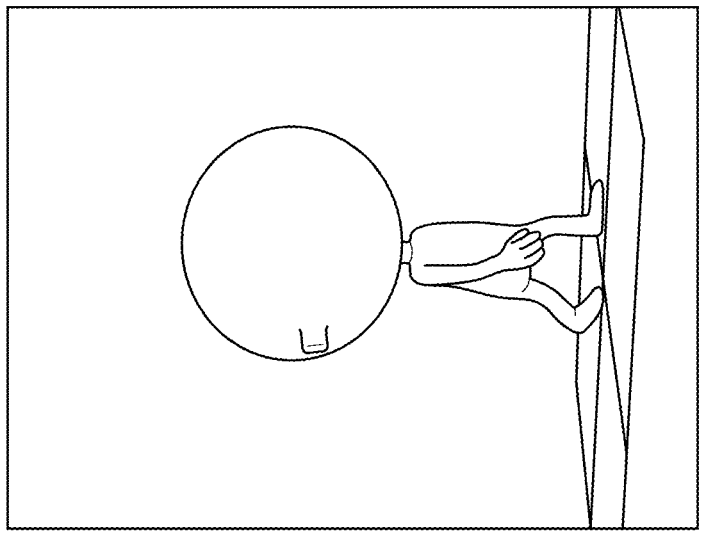
Figure 11:
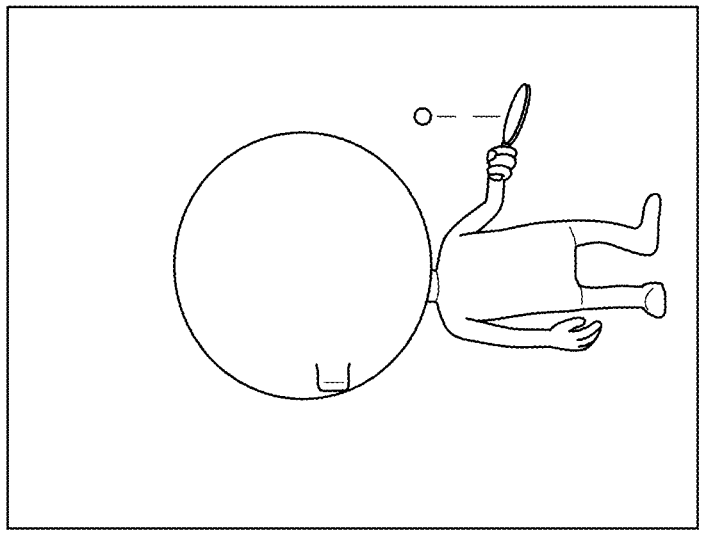
Figure 12:
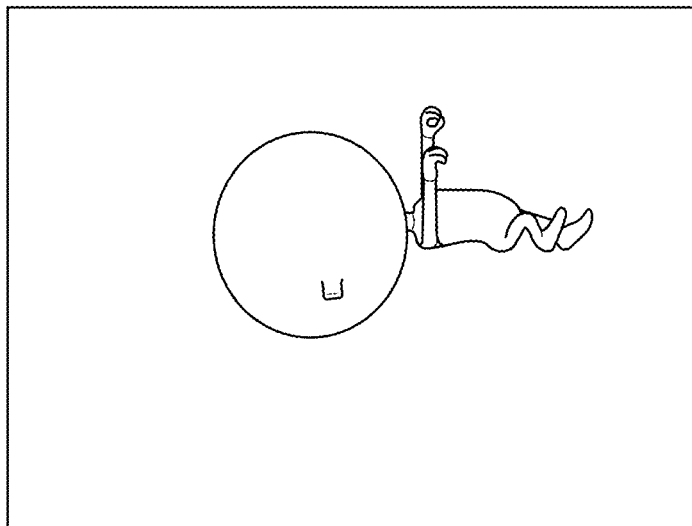
Figure 12:
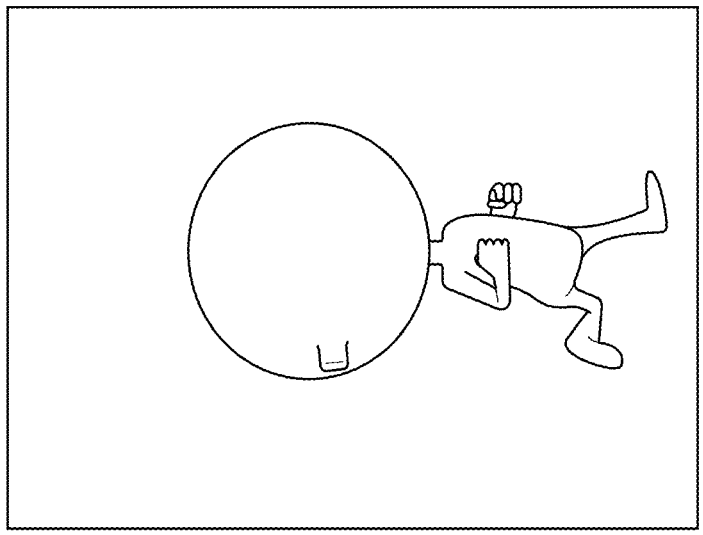
Figure 12:
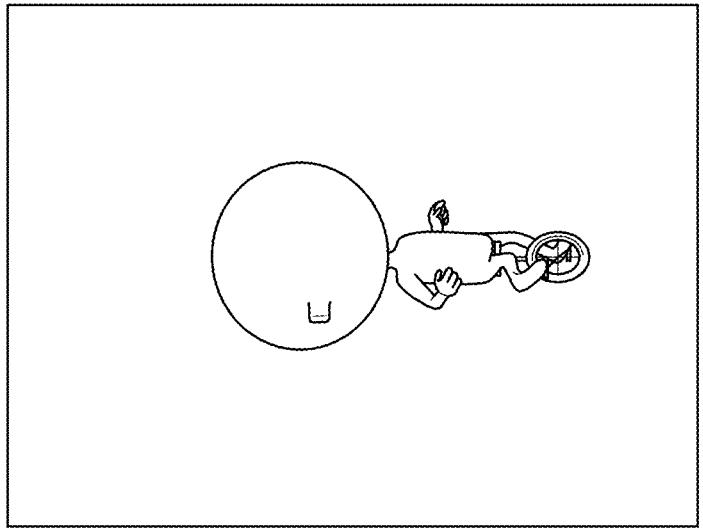
Figure 13:
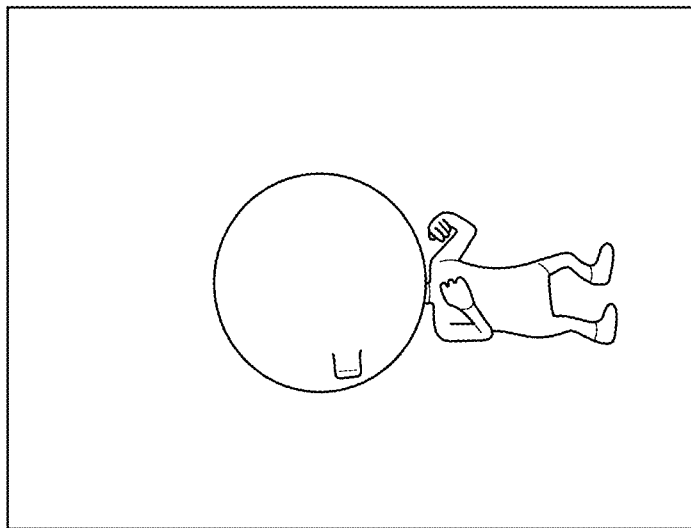
Figure 13:
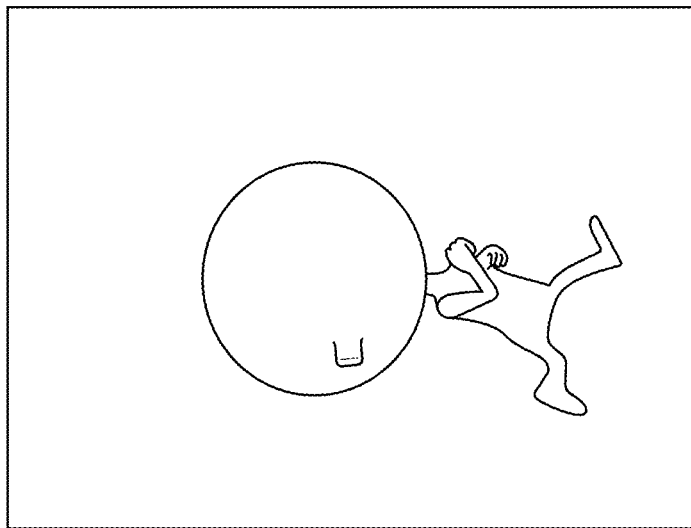
Figure 13:
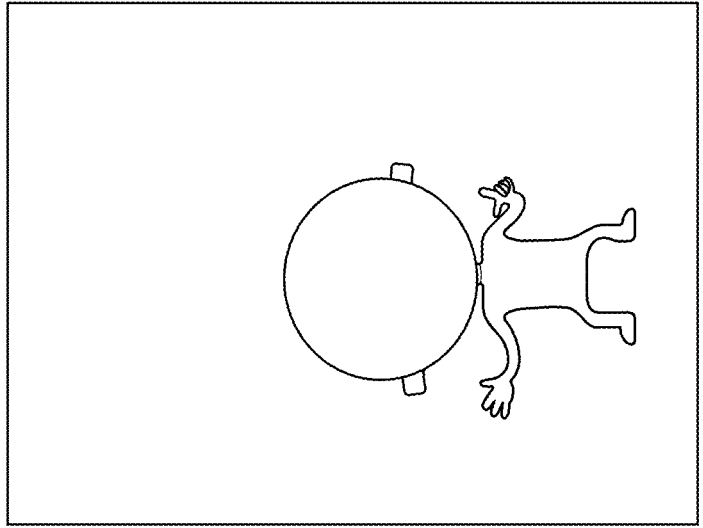

In addition to offering verbal and/or written messages regarding the user's or athlete's athletic performance, the avatar's animation may alternatively or additionally reflect the athletic performance of the user or athlete. In one or more arrangements, the avatar application and/or an athletic performance tracking site or application may determine an animation for the avatar based on an amount of athletic activity performed by the user. FIG. 11, for instance, illustrates that if the user or athlete has demonstrated a low energy level of athletic performance (e.g., based on frequency, duration, and/or intensity of recent workouts), the avatar may be animated performing activities that correspond to low energy (e.g., playing paddle ball, walking/stretching, playing video games, sitting down, and the like). FIG. 12 illustrates the avatar's animation if the user or athlete has demonstrated a medium energy level of athletic performance (e.g., riding a unicycle, jogging/waving, performing the "running man," "sprinkler," "shopping cart," "cabbage patch," "roger rabbit," "robot" or other similar medium energy dance, and the like). FIG. 13 illustrates the avatar's animation if the user or athlete has demonstrated a high energy level of athletic performance (e.g., running/hurdling, shadow boxing/martial arts, high energy dancing such as break/freestyle, hip hop, salsa, urban, "moshing," and other high energy activities). Thus, the data gathered drives the activity of the avatar once the avatar has been rendered. As noted herein, the animation may relate to the avatar's facial expression.

In addition to the avatar's animation, the avatar's background (e.g., if the avatar is part of a screensaver) may be selected and/or generated (e.g., by an athletic performance monitoring site or application or avatar application) to further reflect the energy level of the user's or athlete's athletic performance. For example, low energy backgrounds may include a couch, bed, bean bag, or the like. Medium energy backgrounds may include a street, trail, dance floor, or the like. High energy backgrounds may include a gym, track, boxing ring, martial arts dojo, dance club, or the like. The background may also be specified by the user or athlete and may include pictures, photos, or other representations of spaces, areas, venues, and the like according to their preference. Background colors may also be indicative of a level of energy or activity. For example, blue may indicate a calm or low energy status, yellow a medium level of energy and red, a high level of energy or activity.

Figure 14:
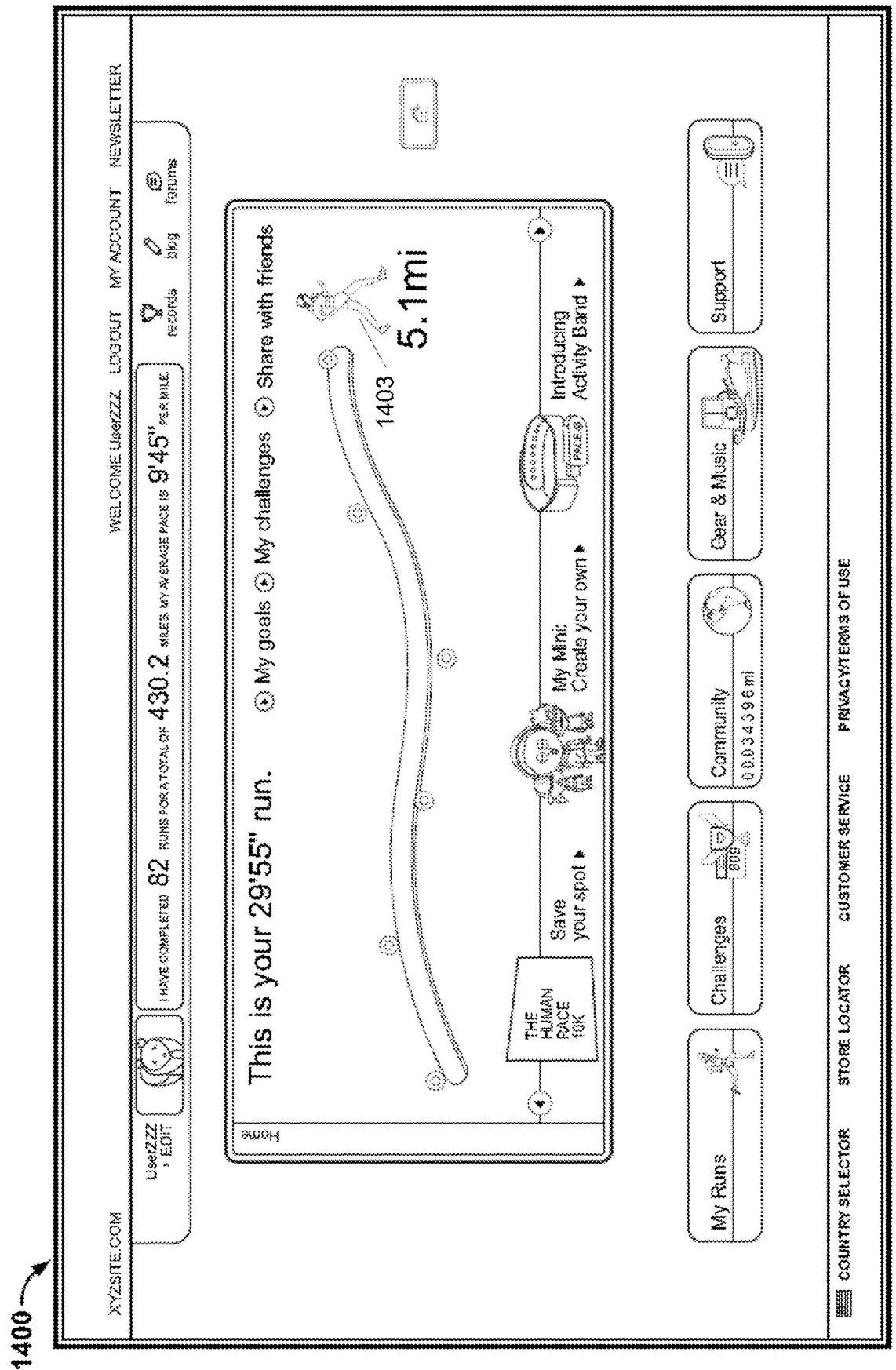
FIGS. 14 and 15 illustrate athletic performance interfaces that include an option to create an avatar.
Figure 15:
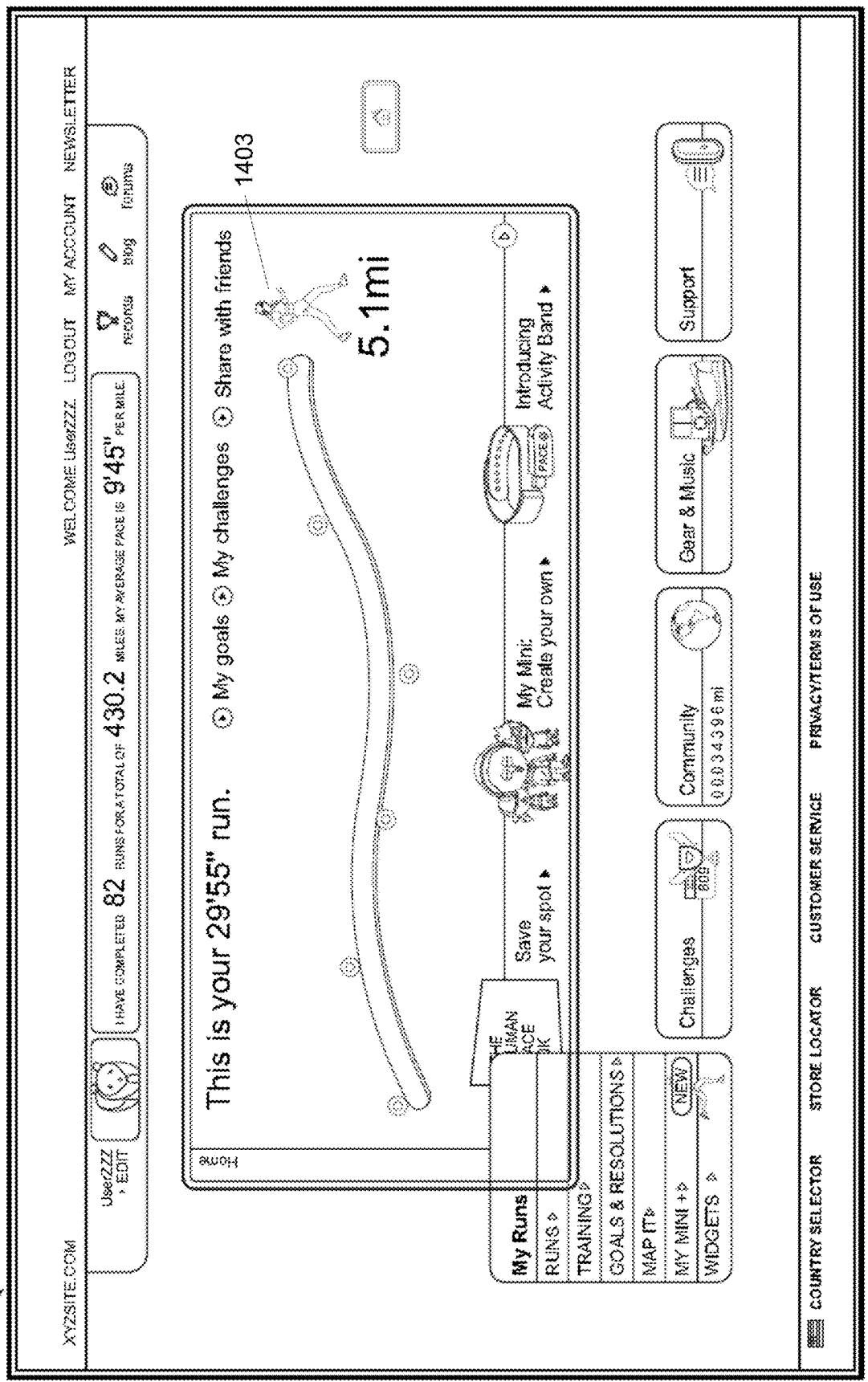

FIGS. 14 and 15 illustrate a user interface 1400 for an athletic performance-based social networking system. As illustrated, in addition to managing runs, training, goals and resolutions, maps, challenges, gear and music, support, and the like for the athletic performance-based social networking system, the user interface 1400 may further allow the user or athlete to create and modify, customize, or otherwise personalize an avatar of an embodiment as described above. The avatar may thereafter represent the user or athlete within the athletic performance-based social networking system. In an embodiment, the avatar may further be animated as described above to indicate an athletic performance or athletic performance energy level of the user or athlete it represents. The avatar may further be animated, for example, with facial expressions and/or other whimsical, random, or otherwise arbitrary motion independent, at least in part, from the user's or athlete's athletic performance. In one or more arrangements, upon the user creating an avatar, the generic image of a running individual 1403 may be replaced with the created avatar (e.g., in a running pose).

Figure 16:
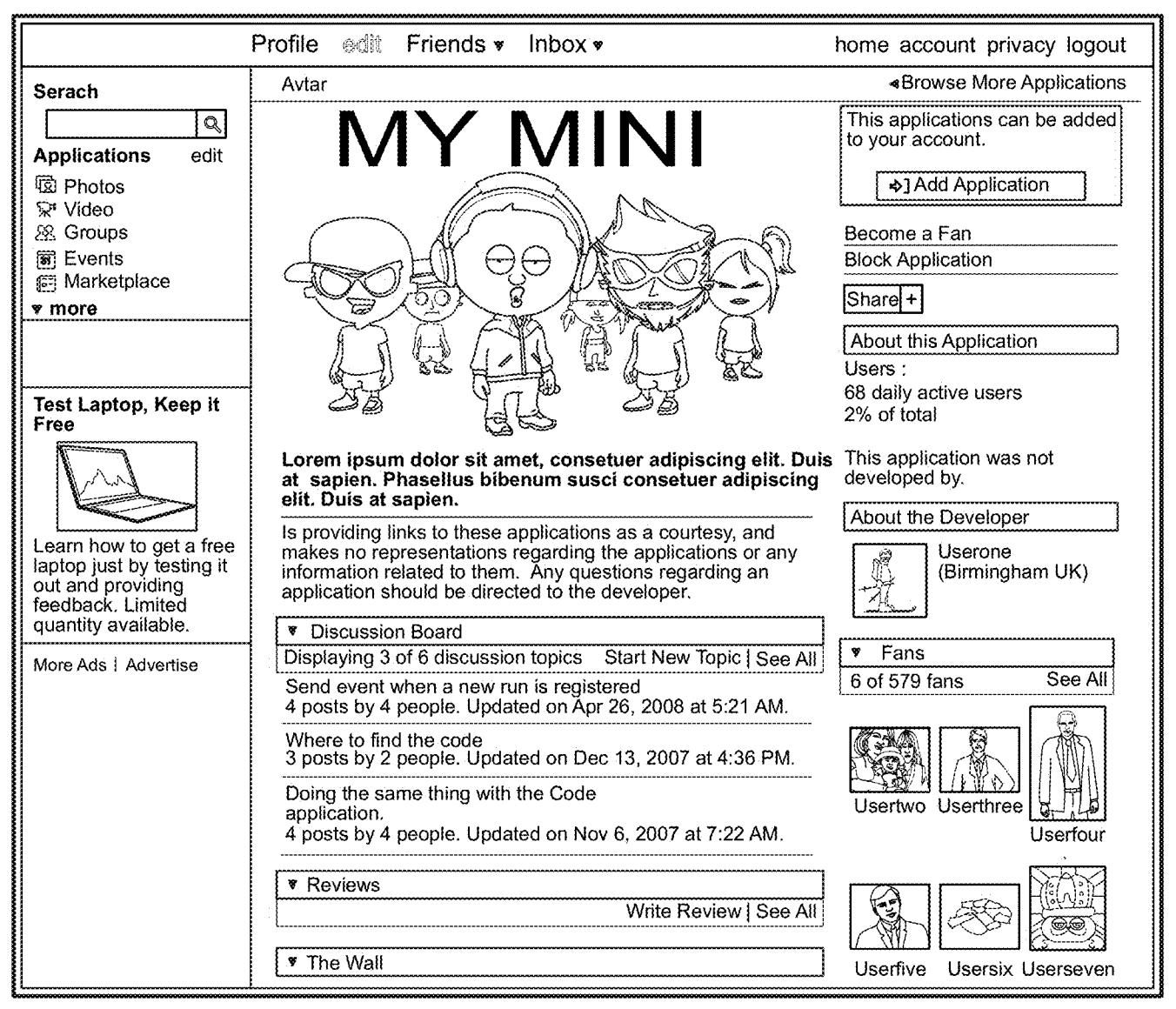
Figure 17:
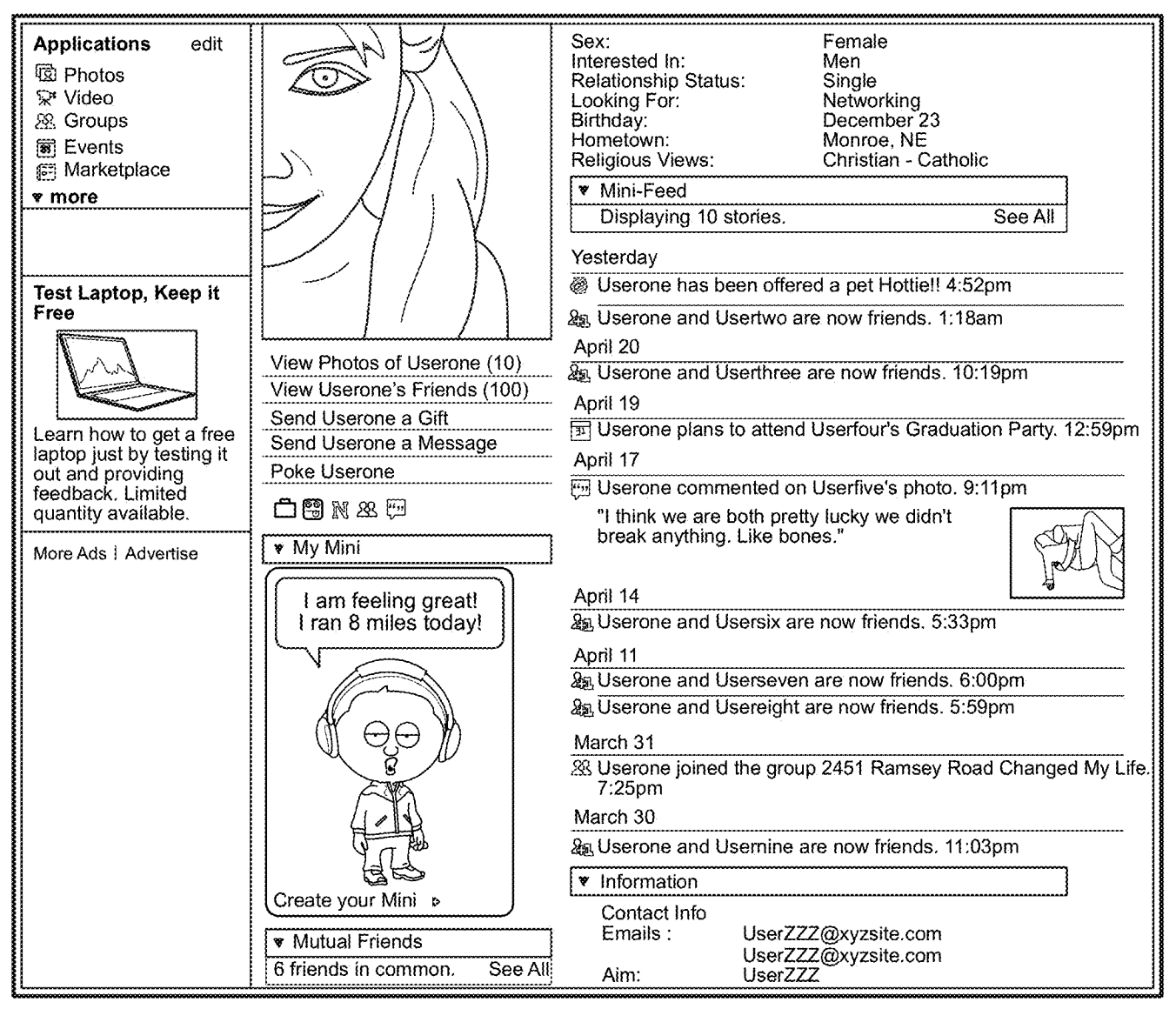

FIGS. 16 and 17 illustrate an avatar application included in a social networking service. For example, the avatar application may allow the user or athlete to create and modify, customize, or otherwise personalize an avatar of an embodiment as described above. The avatar may thereafter represent the user or athlete within the social networking system. In an embodiment, the avatar may further be animated as described above to indicate an athletic performance or athletic performance energy level of the user or athlete it represents. The avatar may further be animated, for example, with facial expressions and/or other whimsical, random, or otherwise arbitrary motion independent, at least in part, from the user's or athlete's athletic performance.

Figure 18:
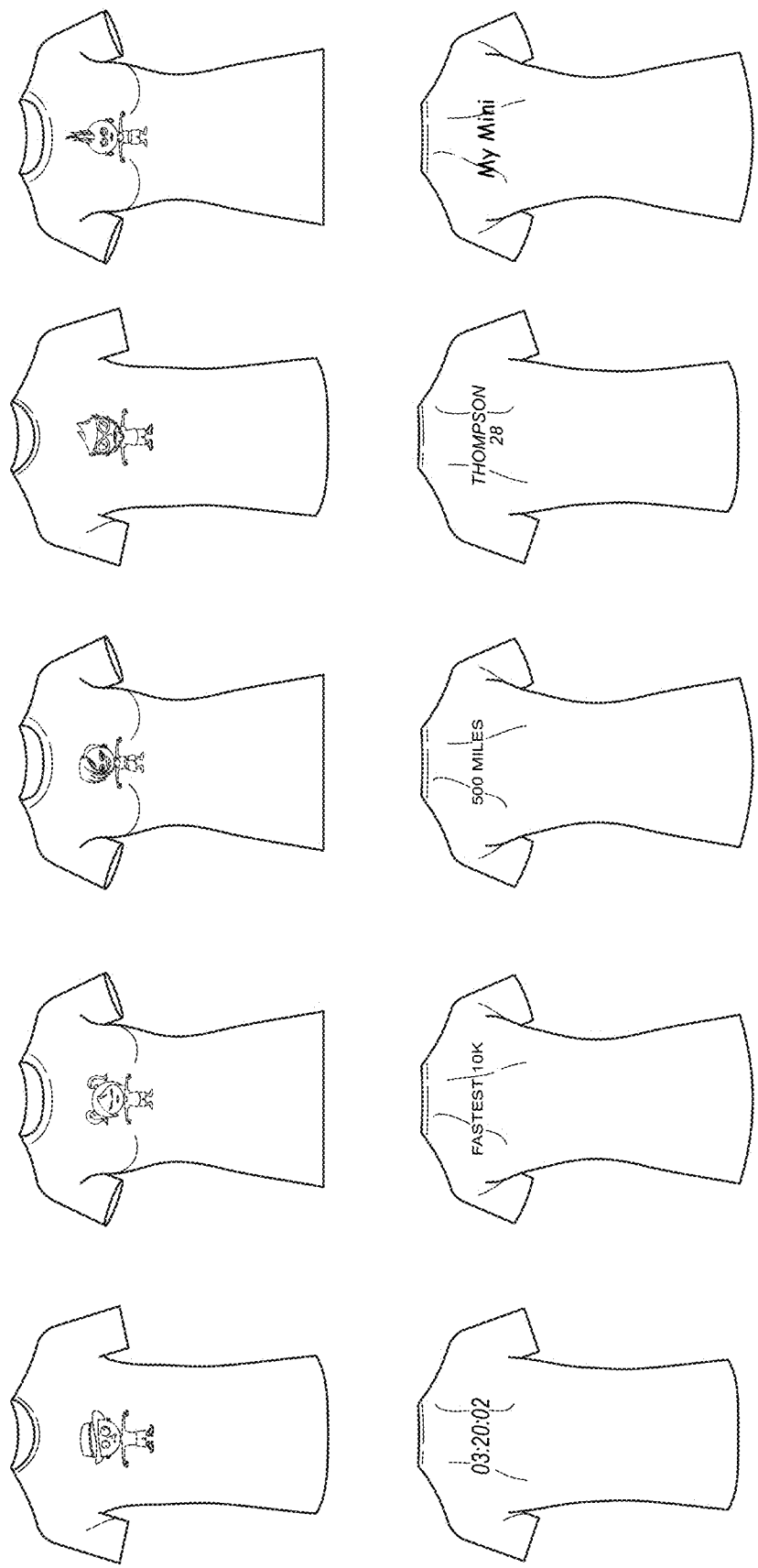
FIG. 18 illustrates a user interface showing avatar related rewards that may be redeemed or purchased.

FIG. 18 illustrates that the user interface 500 and/or 1400 of an embodiment may facilitate a points or other reward system for the user or athlete. For example, a user or athlete may accumulate points commensurate with their athletic performance (e.g., 10 points per mile or kilometer run). Upon the accumulation of a predetermined number of points, a user or athlete may virtually purchase clothes and/or items for their avatar. For example, a particular shirt or other article of apparel may be only available for those avatars whose user or athlete has accumulated a number of points based on their athletic performance. Accordingly, in addition to their personalization and animation, an avatar may further represent a user or athlete with particular articles of apparel or items that are selectively available to users or athletes that have achieved a certain benchmark, milestone, challenge performance, competition/race performance, and/or personal goal. Further, the article of apparel or item may indicate (e.g., "Fastest 10K," "500 Miler," or the like) the benchmark, milestone, challenge performance, competition/race performance, or personal goal it represents.

FIG. 18 further illustrates that the points or other rewards may be redeemed for similar articles of clothing or items for the user or athlete. In addition to indicating that the user or athlete has achieved a certain benchmark, milestone, challenge performance, competition/race performance, and/or personal goal, the article of clothing or item may further include the modified, customized, or otherwise personalized avatar the user or athlete has created. Alternatively or additionally, articles of clothing or items displaying a user's or athlete's modified, customized, or otherwise personalized avatar may be available for the user or athlete to purchase. Rewards for the achievement of goals, milestones, challenges and the like is further described in U.S. application Ser. No. 12/324,140, entitled "INTERACTIVE AVATAR FOR SOCIAL NETWORK SERVICES," and filed on Nov. 26, 2008, and U.S. application Ser. No. 12/031,380, entitled "COLLECTION AND DISPLAY OF ATHLETIC INFORMATION," and filed on Feb. 14, 2008, the contents of both applications being incorporated herein by reference in their entirety.

Numerous specific details have been set forth herein to provide a thorough understanding of the embodiments. It will be understood by those skilled in the art, however, that the embodiments may be practiced without these specific details. In other instances, well-known operations and components have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, also may mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, such as the examples given with reference to FIG. 2. For example, the memory unit may include any memory device, memory article, memory medium, storage device, storage article, storage medium and/or storage unit, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java™, BASIC, Perl™, Matlab™, Pascal, Visual BASIC™, assembly language, machine code, and so forth. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

We claim:

1. A method, comprising:
receiving, by a computing device, user specifications for creating an avatar;
determining, by the computing device, a set of one or more selectable avatar customization options based on an amount of athletic activity performed by a user;
providing the set of one or more avatar customization options to the user; determining, by the computing device, a frequency of a type of athletic activity previously performed by the user;
generating a user interface displaying the avatar and other avatars in a distance traversed competition, where each avatar represents a user competing in the distance traversed competition, the user interface including a first portion displaying all avatars in the distance traversed competition and representing an entirety of a distance associated with the distance traversed competition, and a second portion displaying a portion of the distance associated with the distance traversed competition, the portion of the distance being less than the entirety of the distance associated with the distance traversed competition and the portion of the distance being dynamically determined based on a number of avatars matching a predetermined number of avatars for display in the second portion, the second portion displaying fewer than all of the avatars in the distance traversed competition; and based on the determined frequency of the type of athletic activity previously performed by the user:
selecting a type of activity for the avatar to perform, wherein different frequencies of the type of athletic activity previously performed by the user correspond to different respective types of activity for the avatar to perform; and
animating the avatar to perform the selected type of activity and display the avatar in the second portion.

2. The method of claim 1, wherein the set of one or more avatar customization options include apparel worn by the avatar.

3. The method of claim 2, wherein the apparel includes at least one of: footwear and shirts.

4. The method of claim 1, wherein the set of one or more avatar customization options includes a physical characteristic of the avatar.

5. The method of claim 4, wherein the physical characteristic includes a facial expression.

6. The method of claim 1, further comprising:
receiving a user selection of an avatar characteristic from the set of one or more avatar customization options; and
generating the avatar based on the user specifications and the user selection.

7. The method of claim 6, further comprising:
determining a facial expression of the avatar based on the amount of athletic activity performed by the user; and
applying the facial expression to the avatar.

8. The method of claim 6, further comprising:
determining an interface background based on the amount of athletic activity performed by the user; and
displaying the avatar against the interface background.

9. The method of claim 1, wherein the user specifications include an animated facial expression of the avatar.

10. An apparatus, comprising:
a processor; and
memory storing computer readable instructions that, when executed, cause the apparatus to:
receive user specifications for creating an avatar;
determine a set of one or more avatar customization options based on an amount of athletic activity performed by a first user;
provide the set of one or more avatar customization options to the first user;
determine a frequency of a type of athletic activity previously performed by the first user;
generate a user interface displaying the avatar and other avatars in a distance traversed competition, where each avatar represents a user competing in the distance traversed competition, the user interface including a first portion displaying all avatars in the distance traversed competition and representing an entirety of a distance associated with the distance traversed competition, and a second portion displaying a portion of the distance associated with the distance traversed competition, the portion of the distance being less than the entirety of the distance associated with the distance traversed competition and the portion of the distance being dynamically determined based on a number of avatars matching a predetermined number of avatars for display in the second portion, the second portion displaying fewer than all of the avatars in the distance traversed competition; and
based on the determined frequency of the type of athletic activity previously performed by the first user:
select a type of activity for the avatar to perform, wherein different frequencies of the type of athletic activity previously performed by the first user correspond to different respective types of activity for the avatar to perform; and
animate the avatar to perform the selected type of activity and display the avatar in the second portion.

11. The apparatus of claim 10, wherein the set of one or more avatar customization options include apparel worn by the avatar.

12. The apparatus of claim 11, wherein the apparel includes at least one of: footwear and shirts.

13. The apparatus of claim 10, wherein the set of one or more avatar customization options includes a physical characteristic of the avatar.

14. The apparatus of claim 13, wherein the physical characteristic includes a facial characteristic.

15. The apparatus of claim 10, wherein the computer readable instructions, when executed, further cause the apparatus to:
receive a user selection of an avatar characteristic from the set of one or more avatar customization options; and
generate the avatar based on the user specifications and the user selection.

16. The apparatus of claim 15, wherein the computer readable instructions, when executed, further cause the apparatus to:
determine a facial expression of the avatar based on the amount of athletic activity performed by the user; and
apply the facial expression to the avatar.

17. The apparatus of claim 15, further comprising:
determine an interface background based on the amount of athletic activity performed by the first user; and
display the avatar against the interface background.

18. The apparatus of claim 10, wherein the user specifications include an animated facial expression of the avatar.

19. One or more tangible, non-transitory computer readable media storing computer readable instructions that, when executed, cause an apparatus to:
receive user specifications for creating an avatar;
determine a set of one or more avatar customization options based on an amount of athletic activity performed by a user;
provide the set of one or more avatar customization options to the user; determine a frequency of a type of athletic activity previously performed by the user;
generate a user interface displaying the avatar and other avatars in a distance traversed competition, where each avatar represents a user competing in the distance traversed competition, the user interface including a first portion displaying all avatars in the distance traversed competition and representing an entirety of a distance associated with the distance traversed competition, and a second portion displaying a portion of the distance associated with the distance traversed competition, the portion of the distance being less than the entirety of the distance associated with the distance traversed competition and the portion of the distance being dynamically determined based on a number of avatars matching a predetermined number of avatars for display in the second portion, the second portion displaying fewer than all of the avatars in the distance traversed competition; and based on the determined frequency of the type of athletic activity previously performed by the user:

select a type of activity for the avatar to perform, wherein different frequencies of the type of athletic activity previously performed by the user correspond to different respective types of activity for the avatar to perform; and animate the avatar to perform the selected type of activity and display the avatar in the second portion.

20. The one or more tangible, non-transitory computer readable media of claim 19, wherein the set of one or more avatar customization options include apparel worn by the avatar.

21. The one or more tangible, non-transitory computer readable media of claim 19, wherein the set of one or more avatar customization options includes a physical characteristic of the avatar.

22. The one or more tangible, non-transitory computer readable media of claim 21, wherein the physical characteristic includes a facial characteristic.

23. The one or more tangible, non-transitory computer readable media of claim 19, wherein the computer readable instructions, when executed, further cause the apparatus to:

receive a user selection of an avatar characteristic from the set of one or more avatar customization options; and generate the avatar based on the user specifications and the user selection.

24. The one or more tangible, non-transitory computer readable media of claim 23, wherein the computer readable instructions, when executed, further cause the apparatus to:

determine a facial expression of the avatar based on the amount of athletic activity performed by the user; and apply the facial expression to the avatar.

25. The one or more tangible, non-transitory computer readable media of claim 23, wherein the computer readable instructions, when executed, further cause the apparatus to:

determine an interface background based on the amount of athletic activity performed by the user; and display the avatar against the interface background.

26. The one or more tangible, non-transitory computer readable media of claim 19, wherein determining the set of one or more avatar customization options based on the amount of athletic activity performed by the user includes:

determining whether the user has completed an athletic activity goal; and in response to determining that the user has completed the athletic activity goal, adding an avatar customization option to the set of one or more avatar customization options.

* * * * *